(12) United States Patent
Matsushima

(10) Patent No.: US 10,244,172 B2
(45) Date of Patent: Mar. 26, 2019

(54) IMAGE PICKUP APPARATUS AND IMAGING METHOD THEREFOR

(71) Applicant: CANON KABUSHIKI KAISHA, Tokyo (JP)

(72) Inventor: Kazuki Matsushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/784,926

(22) Filed: Oct. 16, 2017

(65) Prior Publication Data

US 2018/0115693 A1 Apr. 26, 2018

(30) Foreign Application Priority Data

Oct. 21, 2016 (JP) .................................. 2016-207315

(51) Int. Cl.
*H04N 5/232* (2006.01)
*G02B 7/02* (2006.01)
*B08B 7/02* (2006.01)
*G02B 27/00* (2006.01)

(52) U.S. Cl.
CPC ............ *H04N 5/2328* (2013.01); *B08B 7/02* (2013.01); *H04N 5/23293* (2013.01); *G02B 27/0006* (2013.01)

(58) Field of Classification Search
CPC .. H04N 5/2328; H04N 5/23293; H04N 5/225; H04N 5/335; H04N 5/372; B08B 7/02; G02B 27/00
See application file for complete search history.

(56) References Cited

U.S. PATENT DOCUMENTS

| 7,215,372 B2* | 5/2007 | Ito | B08B 7/02 |
| | | | 348/340 |
| 7,499,639 B2* | 3/2009 | Kawai | H04N 5/217 |
| | | | 348/818 |
| 7,876,372 B2* | 1/2011 | Ishibashi | G02B 27/0006 |
| | | | 348/333.01 |
| 8,023,008 B2* | 9/2011 | Okuno | G03B 17/02 |
| | | | 348/241 |

FOREIGN PATENT DOCUMENTS

JP 2008053846 A 3/2008

\* cited by examiner

*Primary Examiner* — Abdelaaziz Tissire
(74) *Attorney, Agent, or Firm* — Canon U.S.A., Inc. IP Division

(57) ABSTRACT

An image pickup apparatus includes an image sensor configured to photoelectrically convert an optical image of a subject to accumulate electric charge, an optical member located on a subject side of the image sensor, a vibration unit configured to vibrate the optical member, a display unit configured to display a moving image based on a captured image signal output from the image sensor, and a control unit configured to perform drive control of the image sensor, the vibration unit, and the display unit, wherein, in a case where the optical member is vibrated while the moving image is displayed, the control unit causes the vibration unit to vibrate the optical member in a time between two readout periods for reading out electric charge accumulated in the image sensor and not to vibrate the optical member in the readout periods.

13 Claims, 19 Drawing Sheets

801

FIG.8C REMOVAL OPERATION STATE

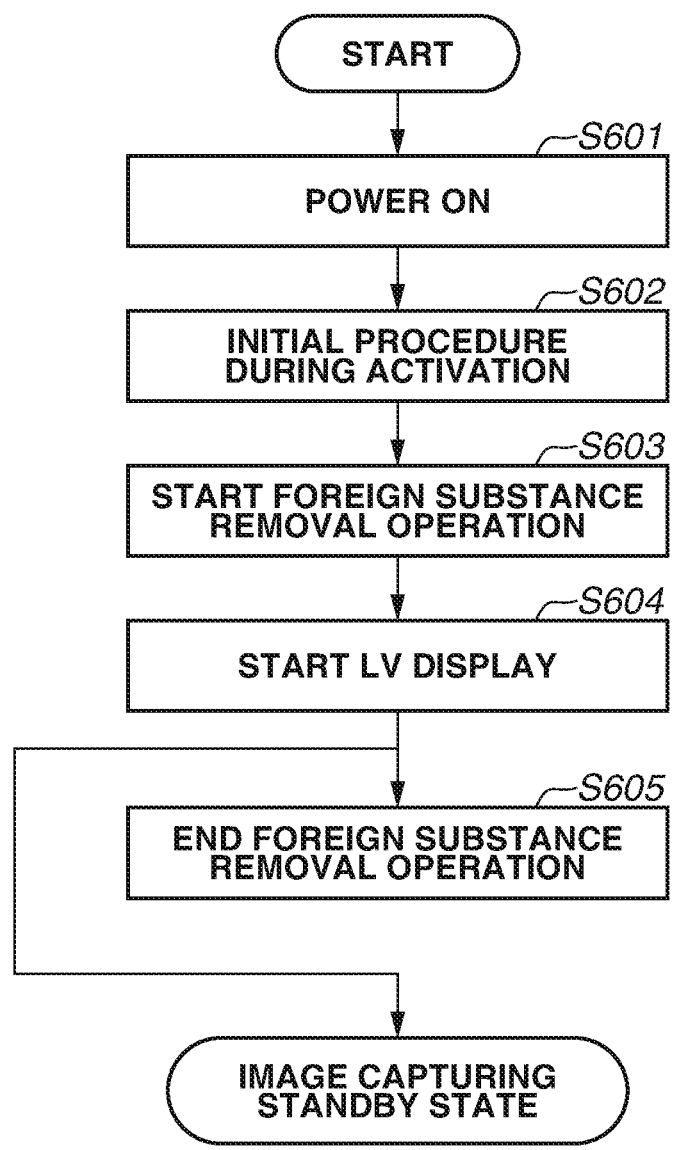

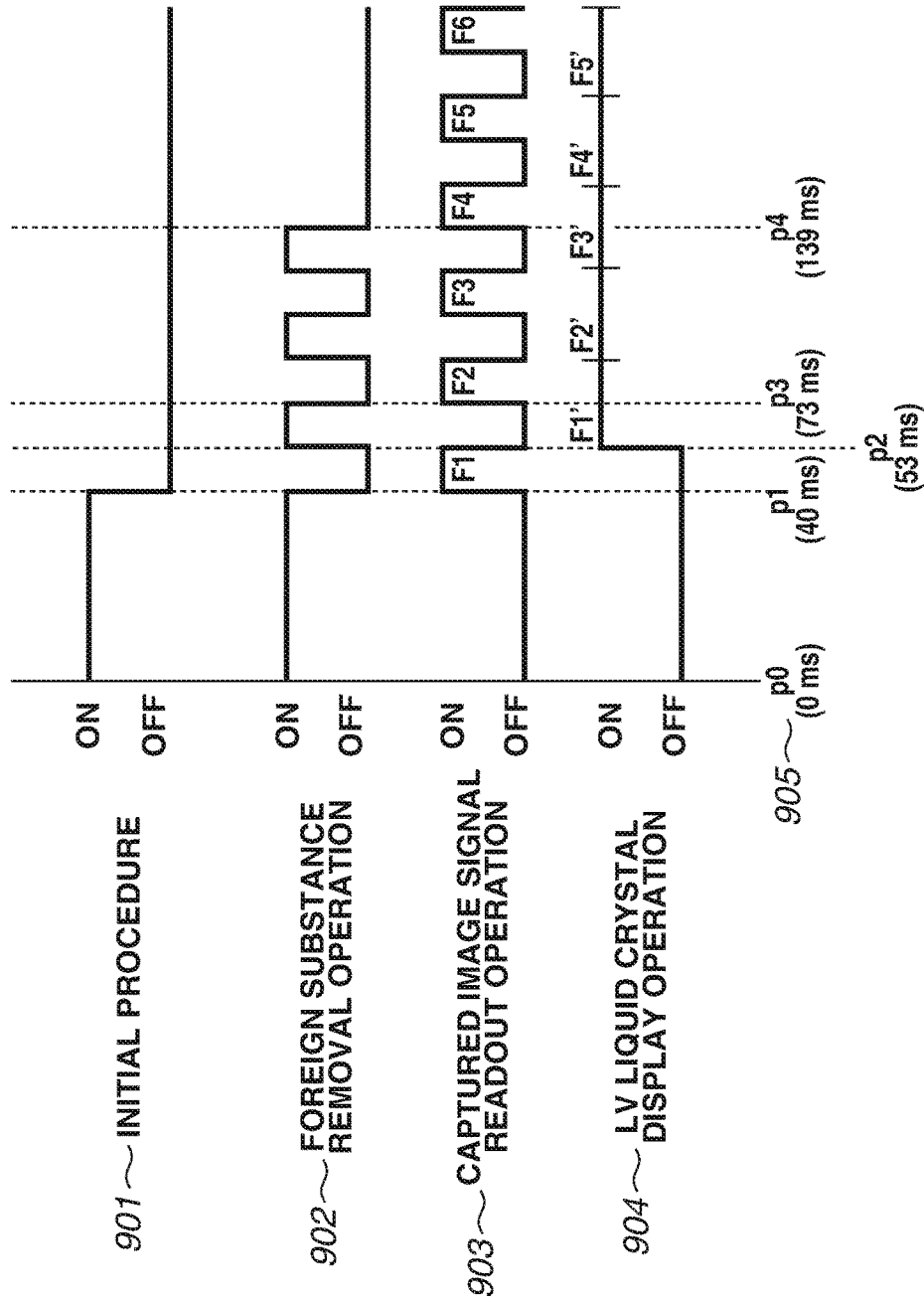

FIG.14A          FIG.14B
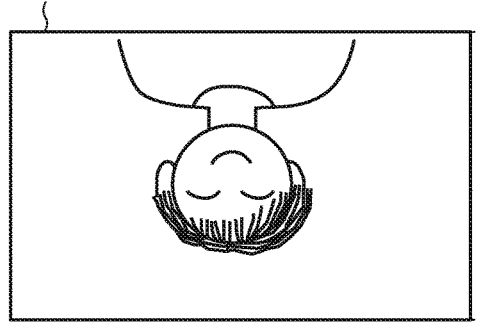
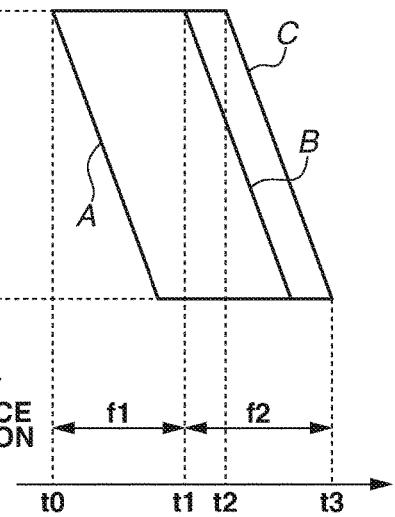
FIG.14C FREQUENCIES OF FOREIGN SUBSTANCE REMOVAL OPERATION

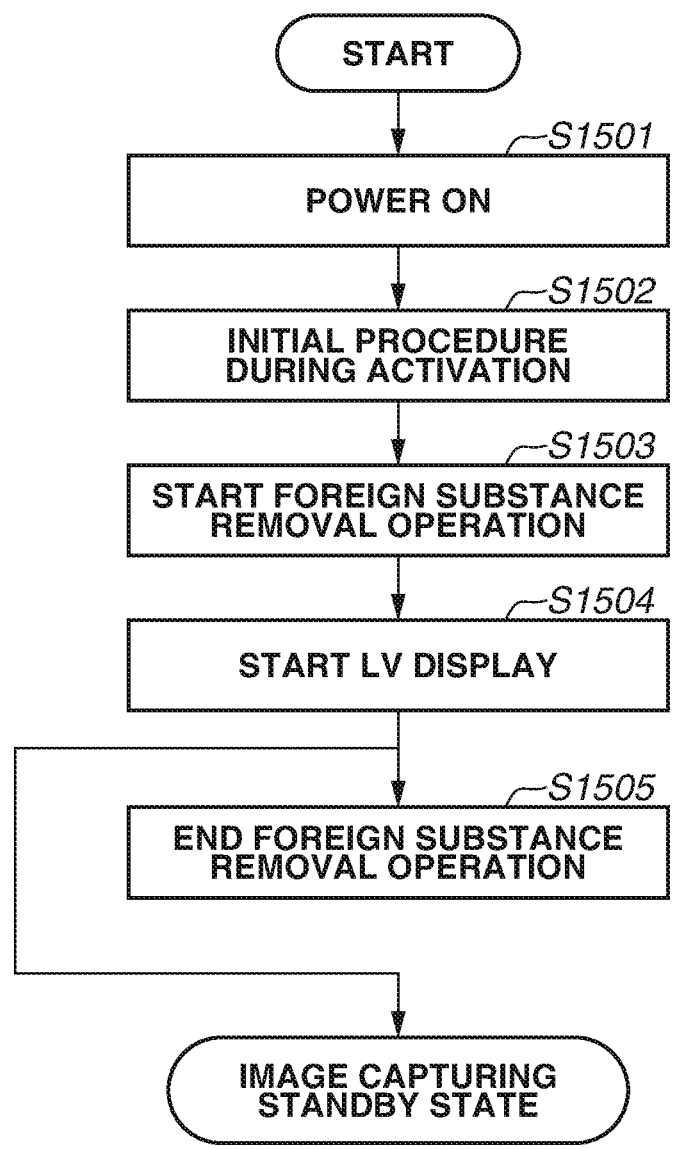

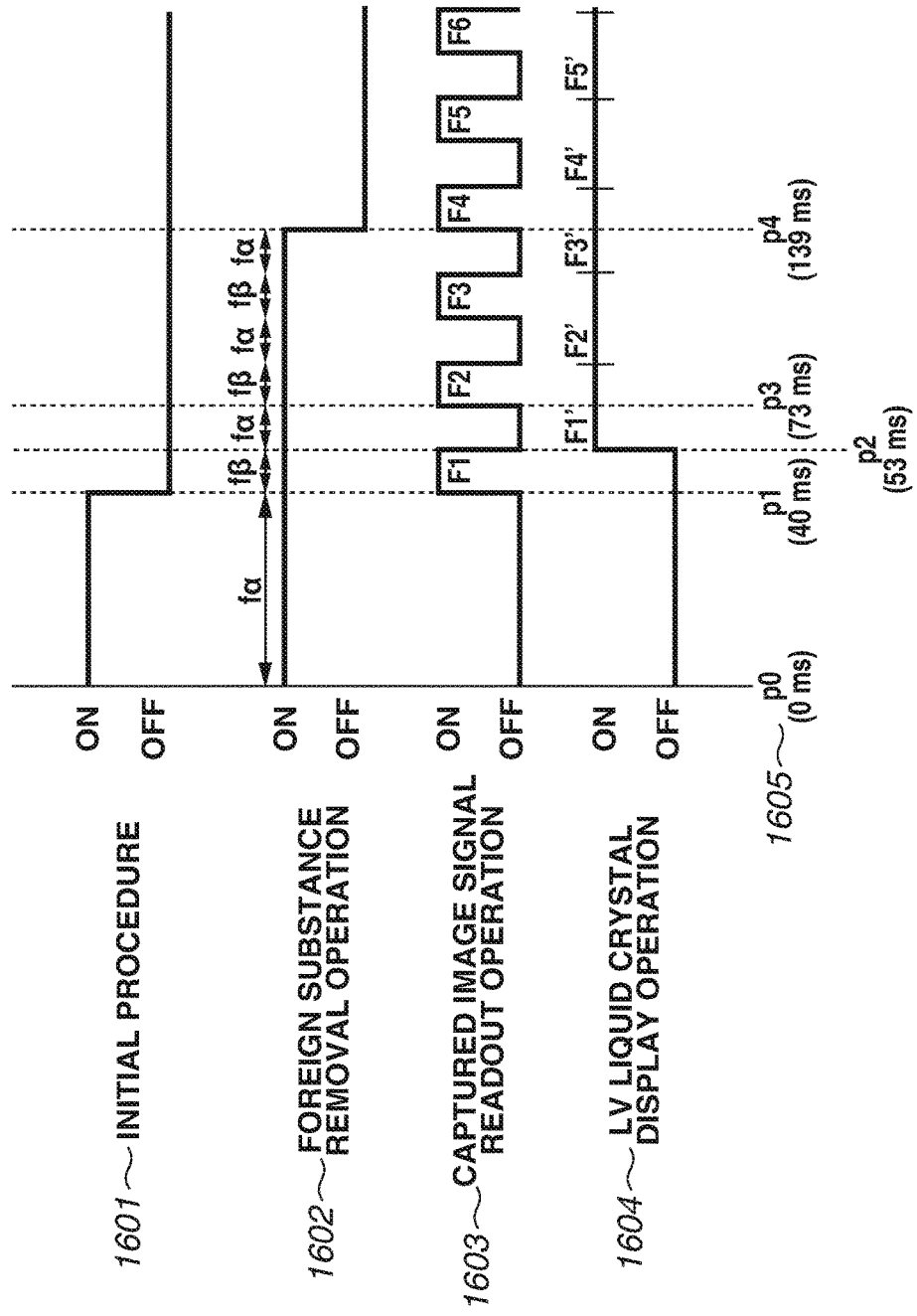

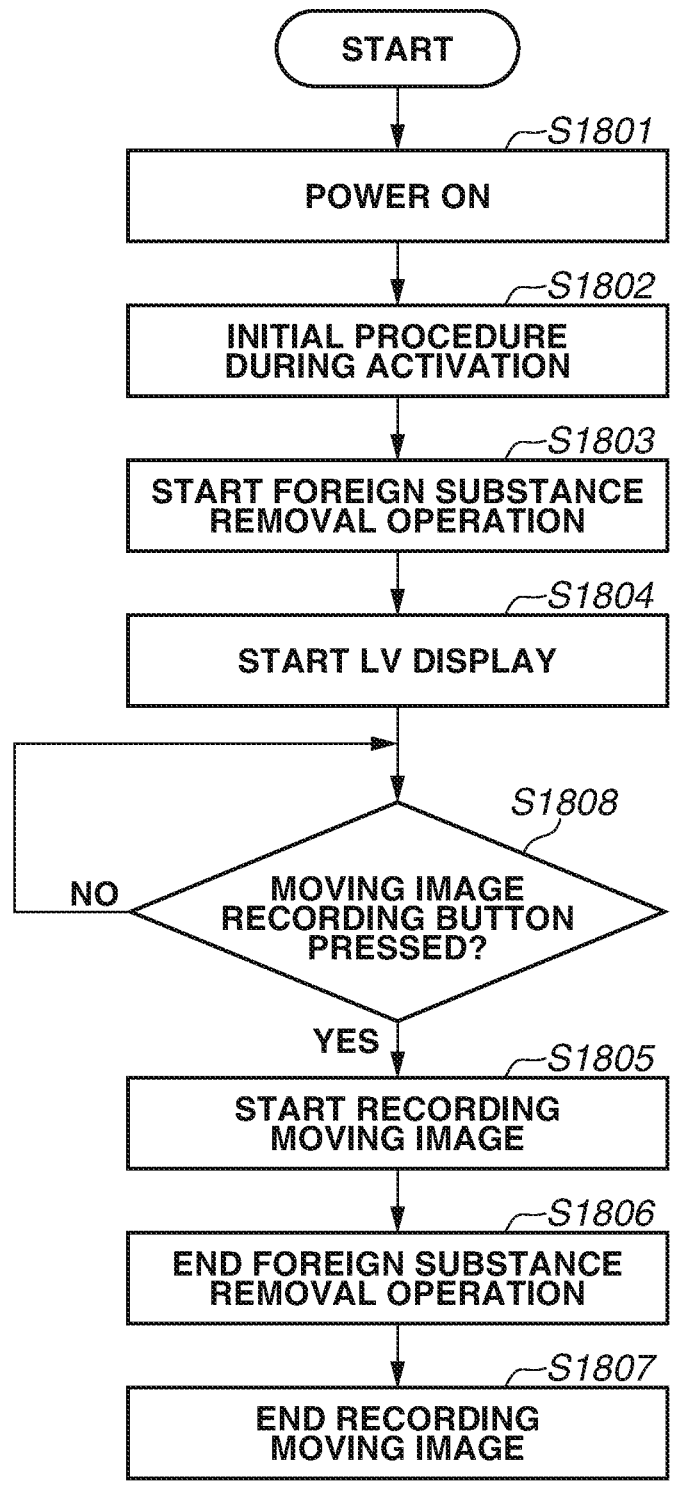

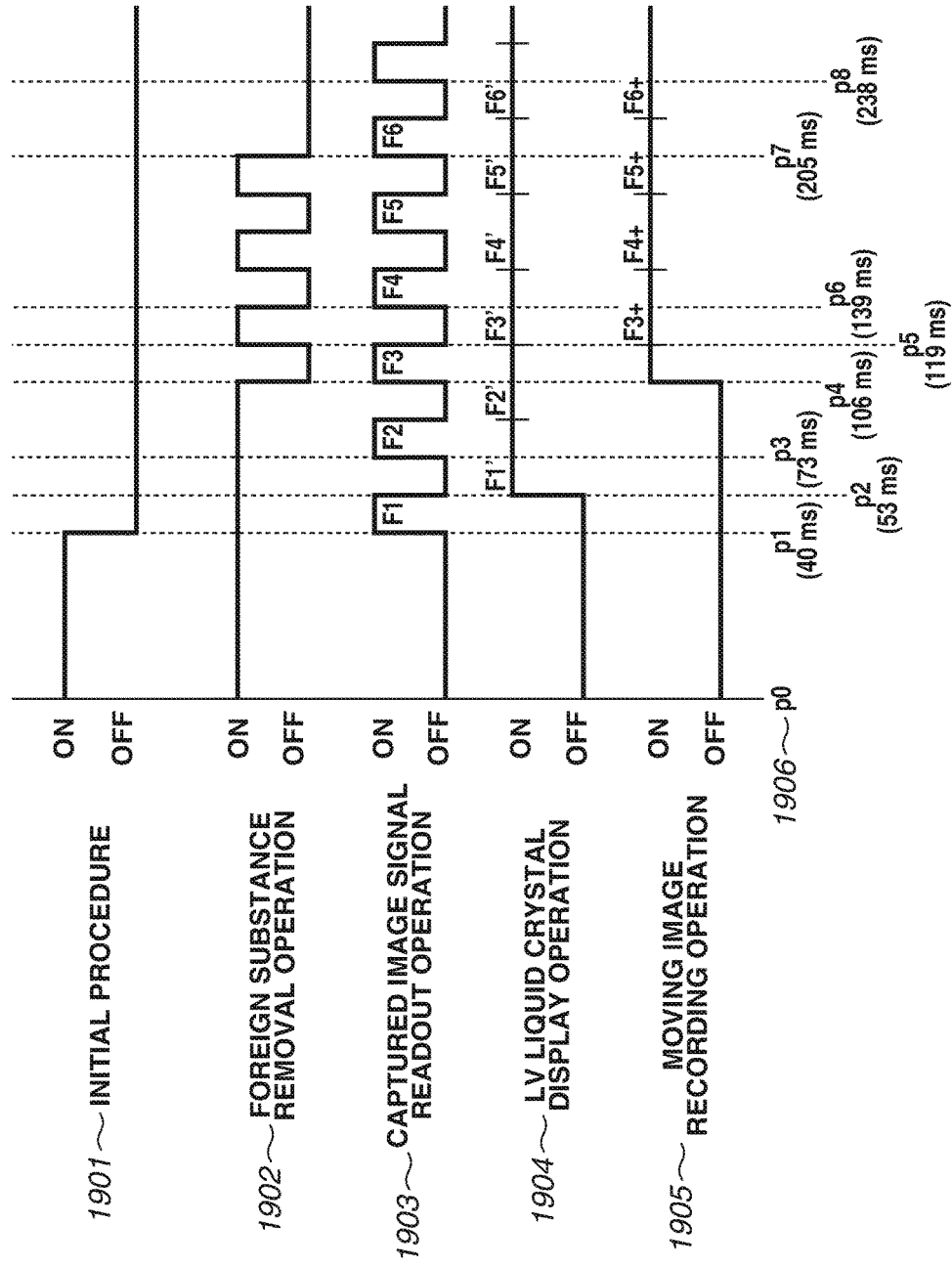

IMAGE PICKUP APPARATUS AND IMAGING METHOD THEREFOR

BACKGROUND OF THE INVENTION

Field of the Invention

Aspects of the disclosure generally relate to an image pickup apparatus equipped with a technology that removes a foreign substance, such as dust, attaching to the surface of an optical member.

Description of the Related Art

An image pickup apparatus, such as a digital camera, that performs image capturing by converting an optical image of a subject into an electrical signal receives an. imaging light flux at an image sensor.

Then, the image pickup apparatus converts a photoelectric conversion signal output from the image sensor into image data and records the image data an a recording medium such as a memory card.

Examples of the image sensor to be used include a charge-coupled device (CCD) sensor and a complementary metal-oxide semiconductor (CMOS) sensor.

In such an image pickup apparatus, an optical low-pass filter or an infrared cut filter is mounted on the subject side of the image sensor.

In this case, if a foreign substance, such as dust, attaches to the surface of a cover glass of the image sensor or a filter thereof, an image of the attachment portion may appear as a black dot and may be contained in a captured image, so that the visual quality of the captured image may deteriorate.

In order to avoid such a phenomenon, there is known a technology that provides the subject side of an image sensor with a dustproof curtain and removes a foreign substance, such as dust, attaching to the surface of the dustproof curtain by vibrating the dustproof curtain with a piezoelectric element.

On the other hand, recent digital cameras perform not only still image capturing but also what is called a live view display function in which the image sensor continuously performs exposure and readout to display a continuously-captured image on a display device such as a liquid crystal monitor.

The live view display function can also be referred to as an "LV display function", a "through-image function", or an "electronic viewfinder function".

Some of such cameras are configured to dispense with an optical viewfinder and to enable the user to confirm a subject image with the use of the LV display function.

While there are cameras equipped with both functions, since most dust removal mechanisms use ultrasonic vibration, if both the LV display function and the dust removal function are simultaneously performed, an LV image may disadvantageously become visually undesirable.

The reason for this is that, since a high voltage is applied to the piezoelectric element, a noise caused by a boosting transformer or a noise caused by an abnormal signal voltage due to variation of electric grounding (GND) would be superimposed on an image signal used for producing an LV image.

Therefore, if an action to avoid this problem is performed, an execution time for the dust removal function would be limited, so that there may be a case where a sufficient dust removal effect cannot be attained.

In order to avoid such a phenomenon, Japanese Patent Application Laid-Open No. 2008-3846 discusses a technique that fixates or stops displaying of a moving image during execution of the dust removal function at the time of displaying an LV image.

In the technique discussed in Japanese Patent Application Laid-Open No. 2008-53846, although the superimposition of noise on a displayed LV image can be avoided, updating of a displayed LV image would be stopped during execution of the dust removal function.

Accordingly, if the execution time is made longer so as to attain the performance of the dust removal function, updating of a screen for displaying an LV image may be stopped for a long time.

However, since, during this time, the user is unable to confirm a subject image in real time, an image capturing operation may be hindered.

SUMMARY OF THE INVENTION

Aspects of the disclosure are generally directed to providing to the user a real-time and good-quality LV video image without stopping updating of a displayed LV image even when the LV function and the dust removal function are simultaneously performed.

According to an aspect of the disclosure, an image pickup apparatus includes an image sensor configured to photoelectrically convert an optical image of a subject to accumulate electric charge, an optical member located on a subject side of the image sensor, a vibration unit configured to vibrate the optical member, a display unit configured to display a moving image based on a captured image signal output from the image sensor, and a control unit configured to perform drive control of the image sensor, the vibration unit, and the display unit, wherein, in a case where the optical member is vibrated while the moving image is displayed, the control unit causes the vibration unit to vibrate the optical member in a time between two readout periods for reading out electric charge accumulated in the image sensor and not to vibrate the optical member in the readout periods.

Further features and aspects of the disclosure will become apparent from the following description of various example embodiments with reference to the attached drawings.

BRIEF DESCRIPTION OF THE DRAWINGS

FIGS. 8A, 8B, and 8C are diagrams illustrating timing of LV display processing and timing of a foreign substance removal operation in the digital camera according to the first, second, and fourth example embodiments of the disclosure.

FIG. 9 is a flowchart illustrating a foreign substance removal operation in the first example embodiment of the disclosure.

FIG. 10 is a timing chart illustrating the foreign substance removal operation in the first example embodiment of the disclosure.

FIGS. 14A, 14B, and 14C are diagrams illustrating timing of LV display processing and timing of a foreign substance removal operation in the digital camera according to the third example embodiment of the disclosure.

FIG. 15 is a flowchart illustrating the foreign substance removal operation in the third example embodiment of the disclosure.

FIG. 16 is a timing chart illustrating the foreign substance removal operation in the third example embodiment of the disclosure.

FIG. 18 is a flowchart illustrating a foreign substance removal operation in the fourth example embodiment of the disclosure.

FIG. 19 is a timing chart illustrating the foreign substance removal operation in the fourth example embodiment of the disclosure.

DESCRIPTION OF THE EMBODIMENTS

Various example embodiments, features, and aspects of the disclosure will be described in detail below with reference to the drawings.

<Diagrams Illustrating External Appearance of Digital Camera>

Figure 1:
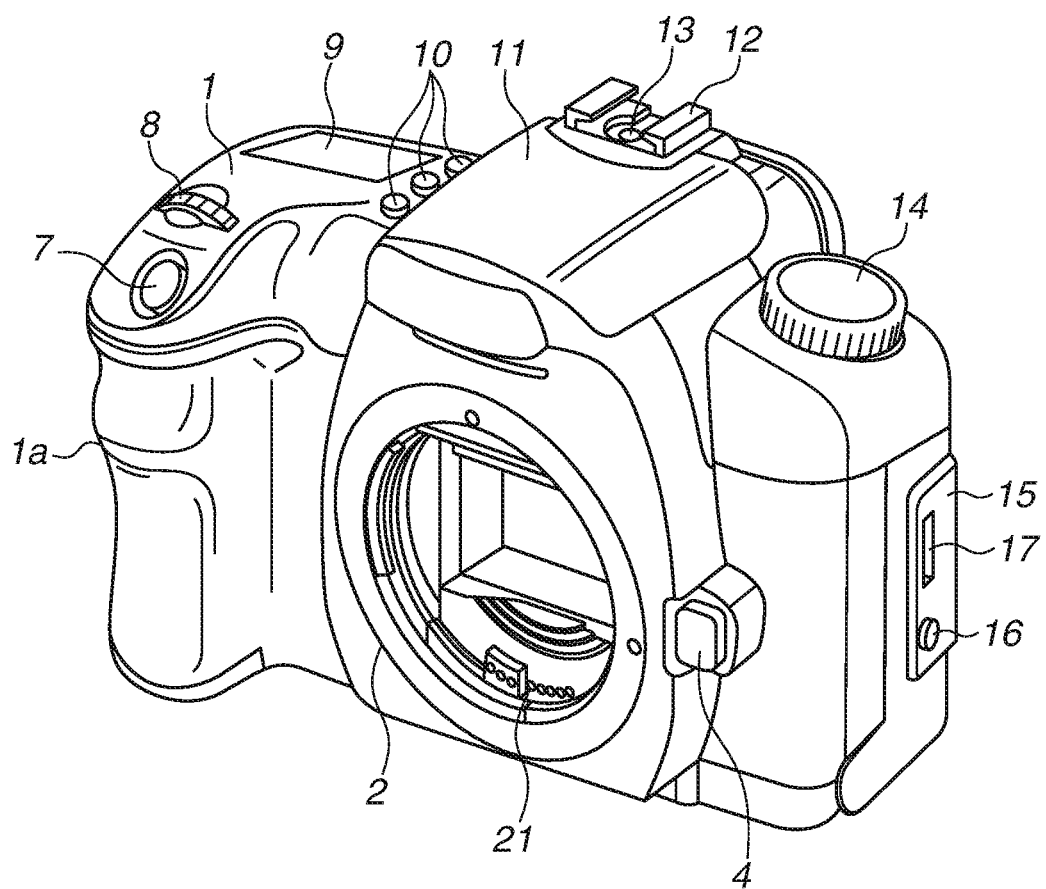
FIG. 1 is a front-side perspective view of a digital camera according to first, second, third, and fourth example embodiments of the disclosure.
Figure 2:
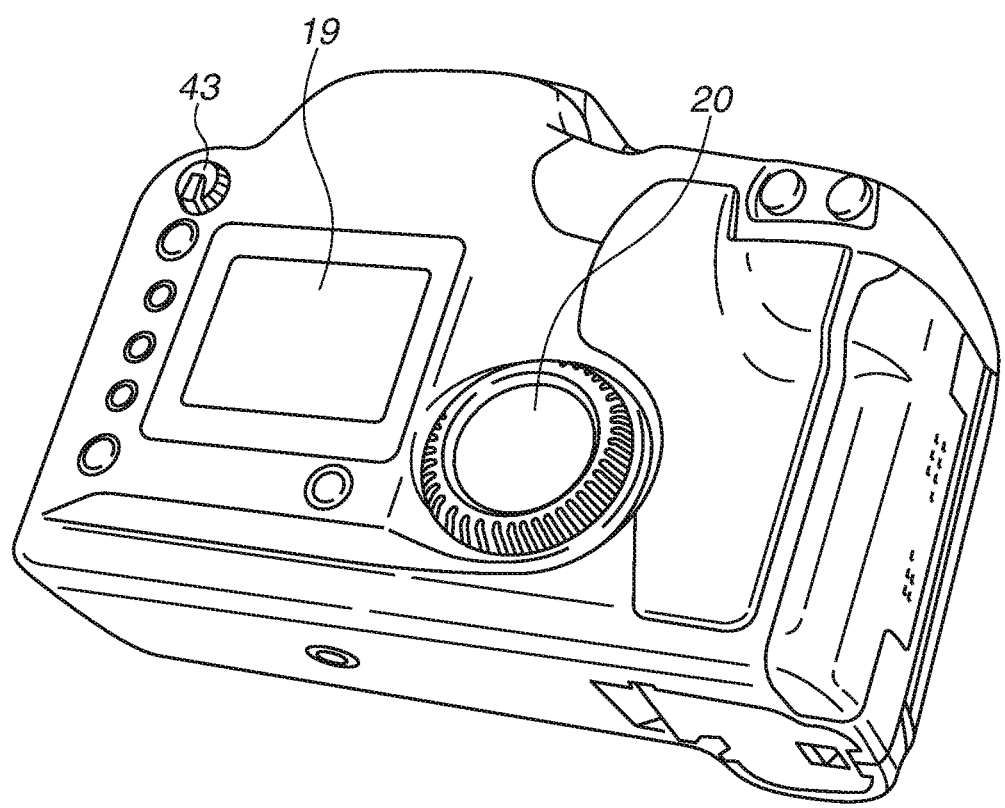
FIG. 2 is a back-side perspective view of the digital camera according to the first, second, and third example embodiments of the disclosure.

FIG. 1 and FIG. 2 are diagrams illustrating an external appearance of a digital camera according to a first example embodiment. Specifically, FIG. 1 is a perspective view as viewed from the front side of the camera, which illustrates a state with an imaging lens unit removed therefrom, and FIG. 2 is a perspective view as viewed from the back side of the camera.

Referring to FIG. 1, a camera body 1 is provided with a grip portion 1a projected forward in such a way as to enable the user to easily grip the camera in a stable manner at the time of image capturing.

A mount portion 2 is used to securely fix a detachable imaging lens unit (not illustrated) to the camera body 1.

Mount contacts 21 have functions to relay, for example, a control signal, a status signal, and a data signal between the camera body 1 and the imaging lens unit and to supply electric power to the imaging lens unit.

Furthermore, the mount contacts 21 can be configured to enable not only electrical communication but also, for example, optical communication or audio communication.

A lens lock release button 4 is configured to be pushed in so as to detach the imaging lens unit from the camera body 1.

At the grip side of the upper portion the camera body 1, there are arranged a shutter button 7, a main operation dial 8, which is used to set a shutter speed or a lens aperture value according to an operation mode during image capturing, and upper-surface operation mode setting buttons 10 related to image capturing.

some of operation results obtained by these operation members are displayed on a liquid crystal display (LCD) panel 9.

The shutter button 7, which serves as an activation switch for starting image capturing, is configured to turn on a switch SW1 (a switch 7a described below) in response to the first stroke thereof and to turn on a switch SW2 (a switch 7b described below) in response to the second stroke thereof.

Furthermore, the upper-surface operation mode setting buttons 10 are used to perform setting between continuous image capturing and single-frame image capturing in response to one push-in operation of the shutter button 7.

Moreover, the upper-surface operation mode setting buttons 10 are also used to perform, for example, setting for a self-timer image capturing mode, and the setting status thereof is configured to be displayed on the LCD panel 9.

At the middle of the upper portion of the camera body 1, there are arranged a built-in flash unit 11, which is configured to pop up from the camera body 1, a shoe groove 12 for attaching an external flash unit, and a flash contact 13, and, at the vicinity of the right side of the upper portion of the camera body 1, there is arranged an image capturing mode setting dial 14.

At the side surface opposite to the side of the grip, there is provided an external terminal lid 15, which is openable and closable.

In the inner portion with the external terminal lid 15 opened, there are contained a jack 16 for video signal outputting and a connector 17 for universal serial bus (USE) outputting, which serve as external interfaces.

Referring to FIG. 2, at the back side of the camera body 1, there is provided a color liquid crystal monitor 19, which is able to display an image.

The color liquid crystal monitor 19 is able to display a moving image generated from an imaging light flux received by an image sensor 33 described below in a live view (LV) display mode described below, so that the user can confirm a subject based on the displayed moving image to perform image capturing.

A subsidiary operation dial 20, which is located lateral to the color liquid crystal monitor 19, assumes the subsidiary role of the functions of the main operation dial 8.

For example, the subsidiary operation dial 20 is used to set an exposure correction amount with respect to a correct exposure value calculated by an automatic exposure device in an automatic exposure (AE) mode in the camera.

Alternatively, in a manual mode in which the shutter speed and the lens aperture value are set according to the intention of the user, the main operation dial 8 is operated to set the shutter speed.

Then, the subsidiary operation dial 20 is operated to set the lens aperture value.

Moreover, the subsidiary operation dial 20 is also used to select a captured image to be displayed on the color liquid crystal monitor 19.

A main switch 43 is used to start or stop the operation of the camera.

<Block Diagram Illustrating Principal Electrical Configuration of Digital Camera>

Figure 3:
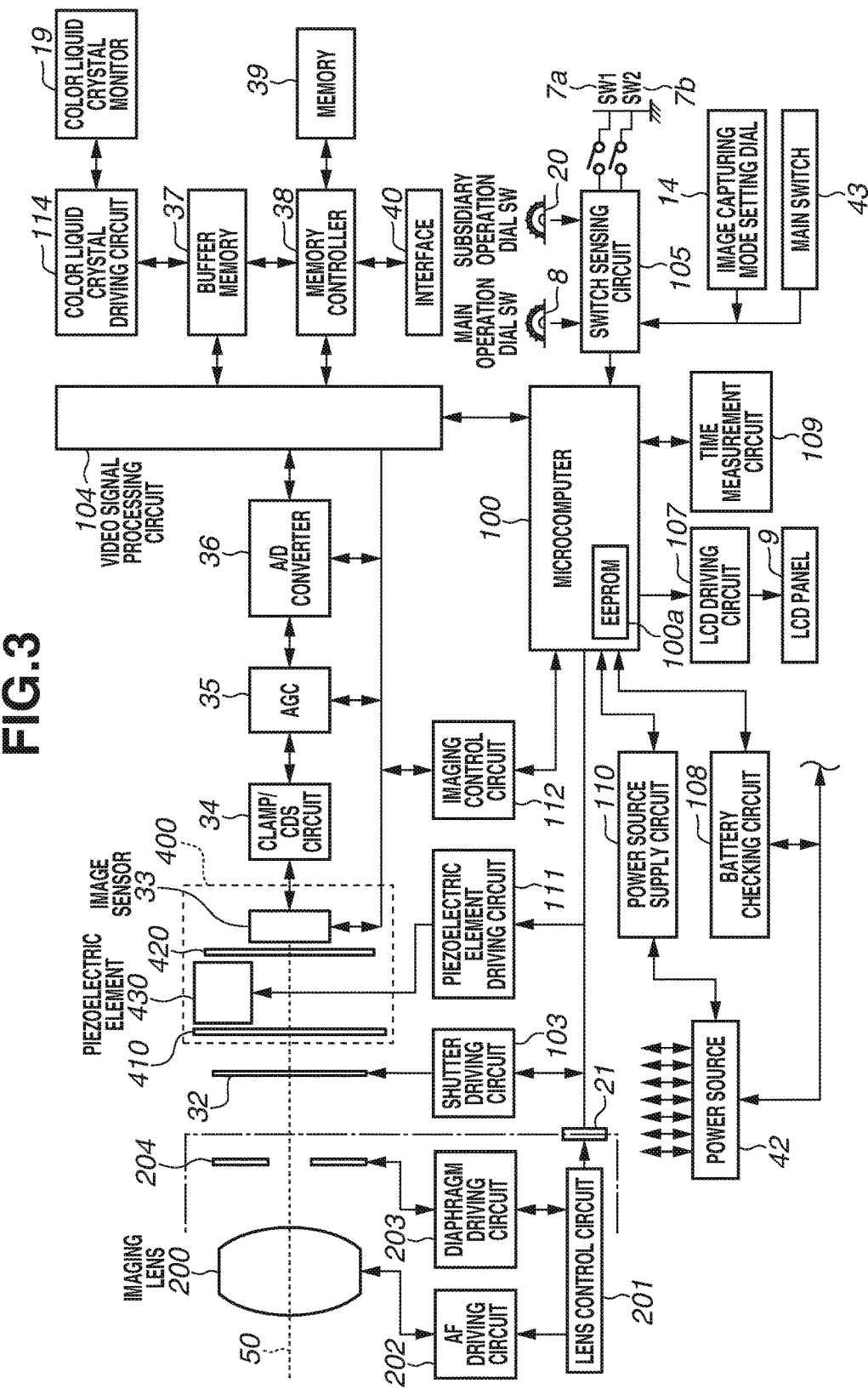
FIG. 3 is a block diagram illustrating an electrical configuration of the digital camera according to the first, second, third, and fourth example embodiments of the disclosure.

FIG. 3 is a block diagram illustrating a principal electrical configuration of the digital camera according to the first example embodiment. Furthermore, portions common to those illustrated in the above-described figures are assigned the respective same reference characters.

An imaging optical axis 50 is indicated by a dashed line.

A microcomputer's central processing unit (hereinafter referred to as an "MPU") 100 is built into the camera body 1.

The MPU 100 assumes the role of operation control of the camera, thus performing various processing operations on and instructions to various constituent elements.

An electrically erasable programmable read-only memory (EEPROM) 100a, which is built in the MPU 100, is able to store counted time information obtained by a time measurement circuit 109 and various other pieces of information as needed, and a shutter driving circuit 103, a video signal processing circuit 104, and a switch sensing circuit 105 are connected to the MPU 100.

Furthermore, an LCD driving circuit 107, a battery checking circuit 108, the time measurement circuit 109, a power source supply circuit 110, a piezoelectric element driving circuit 111, and an imaging control circuit 112 are also are connected to the MPU 100. These circuits are operated under the control of the MPU 100.

Furthermore, the MPU 100 performs communication with a lens control circuit 201, which is arranged in the imaging lens unit, via the mount contacts 21.

The mount contacts 21 also have the function transmitting signals to the MPU 100 when the imaging lens unit is connected the camera body 1.

This enables the lens control circuit 201 to perform communication with the MPU 100 and to drive an imaging lens 200 and a diaphragm 204 contained in the imaging lens unit via an autofocus (AF) driving circuit 202 and a diaphragm driving circuit 203.

Furthermore, in the first example embodiment, the imaging lens 200 is illustrated as a single imaging lens for sake of simplicity, but, actually, is configured with a great number of lens groups.

The AF driving circuit 202 is configured with a stepping motor and adjusts focusing of a subject by changing the position of a focus lens contained in the imaging lens 200 under the control of the lens control circuit 201.

The MPU 100 calculates a defocus amount and a defocus direction based on an imaging light flux received by the image sensor 33.

The MPU 100 drives the focus lens contained in the imaging lens 200 to an in-focus position via the lens control circuit 201 and the AF driving circuit 202 based on the calculated information.

The diaphragm driving circuit 203 is configured with, for example, an auto iris, and is configured to obtain an optical aperture value by changing the diaphragm 204 under the control of the lens control circuit 201.

A mechanical focal-plane shutter 32 is configured to enter a fully-opened state during LV displaying to guide an imaging light flux to the image sensor 33.

Furthermore, during image capturing, the mechanical focal-plane shutter 32 is configured to obtain an intended exposure time based on a time difference between a leading blade group and a trailing blade group (both not illustrated) traveling in response to a shutter-release signal.

The mechanical focal-plane shutter 32 is controlled by the shutter driving circuit 103 receiving an instruction from the MPU 100.

In the first example embodiment, a CMOS sensor, which is an imaging device, is used as the image sensor 33.

The imaging device includes various forms, such as CCD type, CMOS type, and charge injection device (CID) type sensors, and any type of sensor can be used as the image sensor 33.

The CMOS sensor sequentially performs accumulation and readout of electric charge while shifting time for each horizontal line.

A clamp/correlated double sampling (CDS) circuit performs basic analog processing prior to analog-to-digital (A/D) conversion and is also able to change a clamp level.

An automatic gain control (AGC) device 35 performs basic analog processing prior to A/D conversion and is also able to change an. AGC basic level.

An A/D converter 36 converts an analog signal output from the image sensor 33 into a digital signal.

A rectangular infrared cut filter 410, which removes high spatial frequencies, has a surface coated in such a way as to have electrical conductivity so as to prevent attachment of a foreign substance as described below.

An optical low-pass filter 420 is laminated by stacking a plurality of birefringent plates and a plurality of phase plates, made from crystal, in layers.

The optical low-pass filter 420 separates a light flux to be incident on the image sensor 33 into a plurality of light beams and effectively reduces the occurrence of a spurious resolution signal or false color signal.

The piezoelectric element driving circuit 111 is a circuit configured to vibrate a piezoelectric element 430, which is firmly fixed to the infrared cut filter 410.

The piezoelectric element driving circuit 111 vibrates the piezoelectric element 430 according to an instruction from the MPU 100, thus generating vibration amplitudes at the infrared cut filter 410. Furthermore, the method for driving the piezoelectric element 430 is described below.

An imaging unit 400 is a unit obtained by unitizing the infrared cut filter 410, the piezoelectric element 430, the optical low-pass filter 420, and the image sensor 33 together with other components described below, and the detailed configuration thereof is described below.

The imaging control circuit 112 controls charge accumulation and readout of the image sensor 33 according to an instruction from the MPU 100.

The video signal processing circuit 104 performs overall image processing by hardware, such as gamma/knee processing, filter processing, and information synthesis processing for monitor displaying, on digitized image data.

A buffer memory 37 is connected to the video signal processing circuit 104, and moving image data or still image data for monitor displaying output from the video signal processing circuit 104 is temporarily stored in the buffer memory 37 and is then supplied via a color liquid crystal driving circuit 114 to and displayed on the color liquid crystal monitor 19.

With regard to the LV displaying function, the imaging control circuit 112 sequentially performs charge accumulation and readout at a time interval corresponding to a moving image frame rate from the image sensor 33 according to an instruction from the MPU 100.

Then, the readout signal is temporarily stored in the buffer memory 37 via the clamp/CDS circuit 34, the AGC 35, the A/D converter 36, and the video signal processing circuit 104.

Then, the color liquid crystal driving circuit 114 continuously displays a video image read out of the buffer memory 37 on the color liquid crystal monitor 19 at an update interval corresponding to the frame rate.

Furthermore, the video signal processing circuit 104 also has a function to perform image data compression processing such as Joint Photographic Experts Group (JPEG).

In a case where image capturing is continuously performed during, for example, continuous image capturing, the video signal processing circuit 104 can temporarily stores image data in the buffer memory 37 and sequentially read out unprocessed image data via a memory controller 38.

This enables the video signal processing circuit 104 to sequentially perform image processing or image compression irrespective of the speed of image data that is being input from the A/D converter 36.

An external interface 40 is equivalent to the jack 16 for video signal outputting and the connector 17 for USB outputting illustrated in FIG. 1.

The memory controller 38 also has functions to store image data input from the eternal interface 40 in the memory 39 and to output image data stored in the memory 39 from the external interface 40.

Furthermore, the memory 39 is, for example, a flash memory which is attachable to and detachable from the camera body 1.

The power source supply circuit 110 supplies electric power required for a cleaning mode to various components of the camera body 1 as needed.

Furthermore, concurrently with this, the power source supply circuit 110 detects the remaining battery level of a power source 42 and transmits a result of the detection to the MPU 100.

Upon receiving a signal for starting the cleaning mode, the MPU 100 causes the shutter driving circuit 103 to drive the focal-plane shutter 32 to a position to recede from an imaging light flux.

When the digital camera is in the cleaning mode, the user is enabled to directly perform cleaning to remove a foreign substance on the infrared cut filter 410 using, for example, a cotton swab, lens cleaning-paper, or rubber.

The switch sensing circuit 105 transmits signals input according to the operation states of the respective switches to the MPU 100.

The switch 7a corresponds to the switch SW1 which is configured to be turned on in response to the first stroke of the release button 7. The switch 7b corresponds to the switch SW2 which is configured to be turned on in response to the second stroke of the release button 7.

When the switch SW2 is turned on, an instruction for starting image capturing is transmitted to the MPU 100. Furthermore, signals output from the main operation dial 8, the subsidiary operation dial 20, the image capturing mode setting dial 14, and the main switch 43 are transmitted to the MPU 100 via the switch sensing circuit 105.

The LCD driving circuit 107 drives the LCD panel 9 according to an instruction from the MPU 100.

The battery checking circuit 108 performs battery checking for a predetermined time according to an instruction from the MPU 100, and transmits an output indicating a result of checking to the MPU 100.

The power source 42 supplies required power to various elements of the camera.

The time measurement circuit 109 measures a time from when the main switch 43 is turned off until the main switch 43 is next turned on and the date and time thereof, and is able to transmit a result of measurement to the MPU 100 according to an instruction from the MPU 100.

<Holding Structure for Imaging Unit 400>

Next, the detailed configuration of the imaging unit 400 is described as follows with reference to FIG. 4 to FIG. 7.

Figure 4:
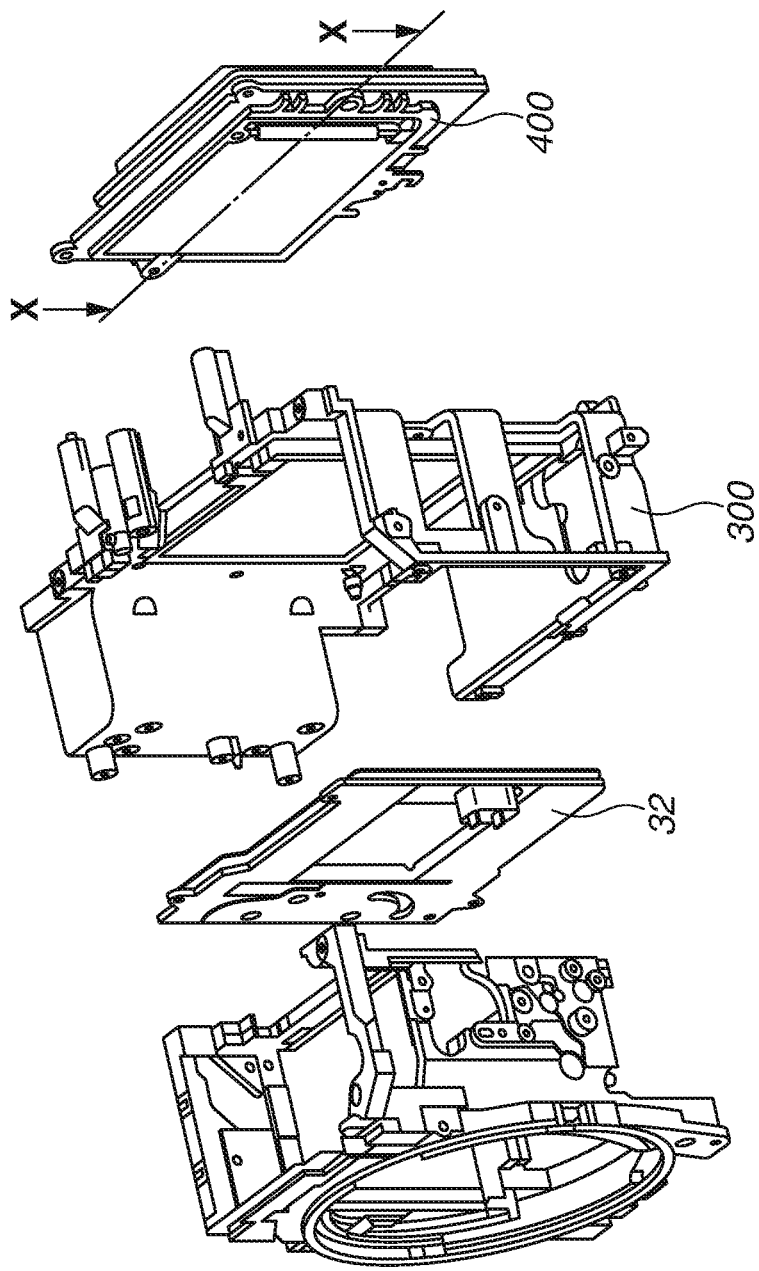
FIG. 4 is an exploded perspective view illustrating a schematic configuration of the inside of the digital camera used to explain a holding mechanism in the vicinity of an optical member and an image sensor of the digital camera according to the first, second, third, and fourth example embodiments of the disclosure.

FIG. 4 is an exploded perspective view illustrating a schematic configuration of the inside of the camera, which is used to explain a holding structure for the vicinity of the infrared cut filter 410, which has a surface coated in such a way to have electrical conductivity, and the image sensor 33.

The shutter unit (focal-plane shutter) 32 is located at the subject side of a body chassis 300, which serves as a framework of the camera body 1, and the imaging unit 400 is located at the operator side thereof.

Particularly, the imaging unit 400 is adjusted and fixed in such a manner that the imaging Mane of the image sensor 33 is at a predetermined distance from and in parallel with the attaching surface of the mount portion 2, which serves as a reference surface to which the imaging lens unit is attached.

<Perspective View of Imaging Unit 400>

Figure 5:
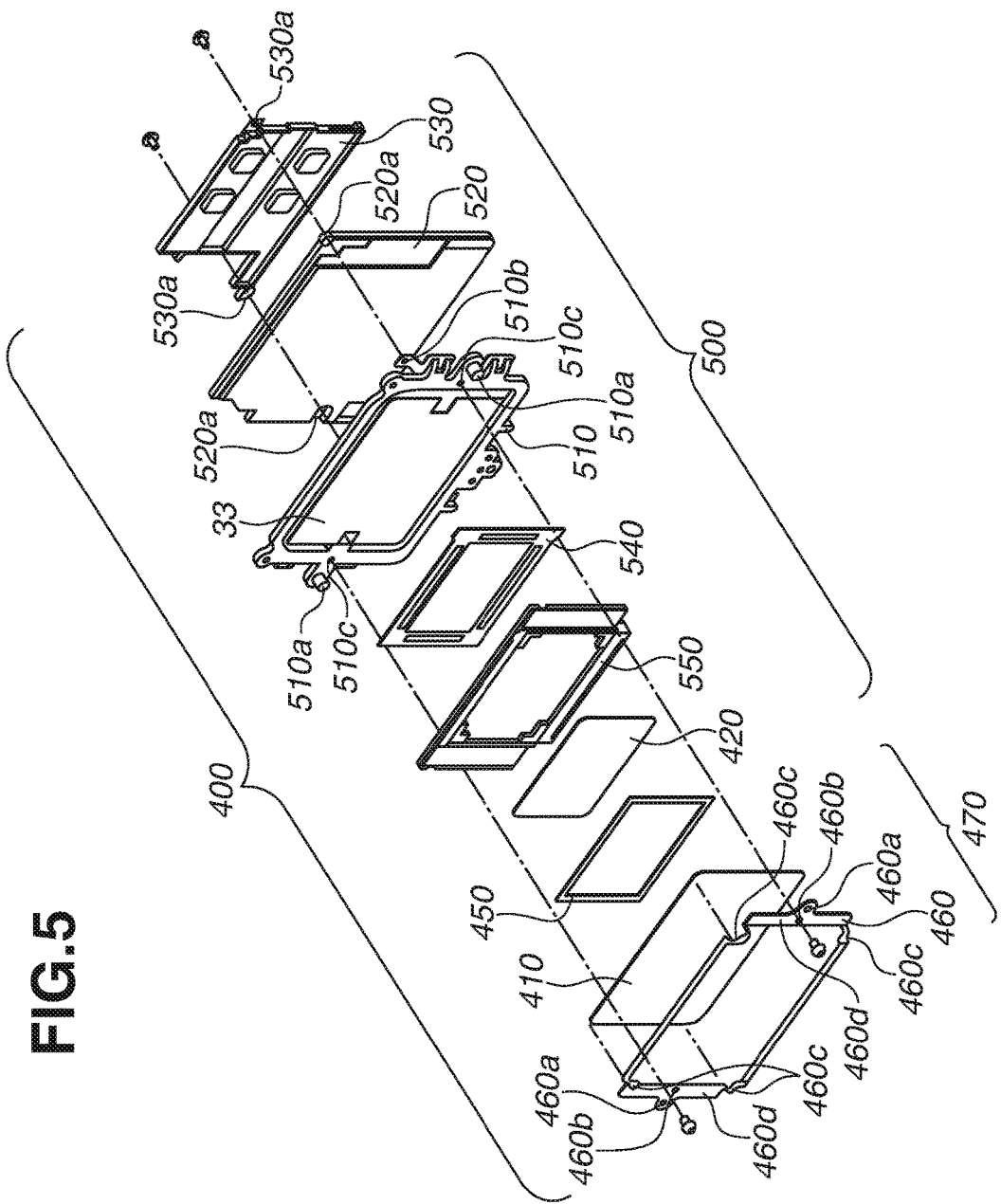
FIG. 5 is an exploded perspective view illustrating a configuration of an imaging unit of the digital camera according to the first, second, third, and fourth example embodiments of the disclosure.

FIG. 5 is an exploded perspective view illustrating a configuration of the imaging unit 400. The imaging unit 400 includes a vibration unit 470, an image sensor unit 500, and an elastic member 450.

The image sensor unit 500 includes the image sensor 33, an image sensor holding member 510, a circuit board 520, a shield case 530, the optical low-pass filter 420, a light-blocking member 540, and an optical low-pass filter holding member 550.

The image sensor holding member 510 is formed from, for example, metal and is provided with positioning pins 510a, screw holes 510b, and screw holes 510c.

The circuit board 520 has electrical circuits related to imaging mounted thereon and is provided with clearance holes 520a for screws.

The shield case 530 is formed from, for example, metal and is provided with clearance holes 530a for screws.

The circuit board 520 and the shield case 530 are fastened to the image sensor holding member 510 with screws via the clearance holes 520a for screws, the clearance holes 530a for screws, and the screw holes 510b.

The shield case 530 is connected to the ground potential on a circuit so as to protect electrical circuits from, for example, static electricity.

The light-blocking member 540 has an aperture formed therein corresponding to an effective region of the photoelectric conversion surface of the image sensor 33 and has double-sided adhesive tapes firmly attached to the subject side and the operator side thereof.

The optical low-pass filter holding member 550 is firmly fixed to a cover glass 33a (see FIG. 7) of the image sensor 33 via the double-sided adhesive tapes of the light-blocking member 540.

The optical low-pass filter 420 is positioned at an aperture portion of the optical low-pass filter holding member 550 and is fixed to and held at the light-blocking member 540 via the double-sided adhesive tapes of the light-blocking member 540.

The vibration unit 470 is positioned with respect to the image sensor unit 500 via positioning holes 460a and the positioning pins 510a.

The vibration unit. 470 is fastened to the image sensor unit 500 across the elastic member 450 with screws via clearance holes 460b for screws and the screw holes 510c.

This enables causing electricity occurring on the surface of the infrared cut filter 410 to escape to the circuit board 520 via a holding member 460, the image sensor holding member 510, and the shield case 530, so that attachment of a foreign substance can be prevented.

The elastic member 450 is be formed from a soft material, such as rubber, and not only functions as a vibration absorption portion for the infrared cut filter 410 but also forms a hermetically-closed space between the infrared cut filter 410 and the optical low-pass filter 420.

Furthermore, to increase the vibration absorption property for the infrared cut filter 410, it is desirable that the elastic member 450 be configured with a thick member or a low-hardness member and abut on a node portion of vibration of the infrared cut filter 410.

<Perspective View of Vibration Unit 470>

Figure 6:
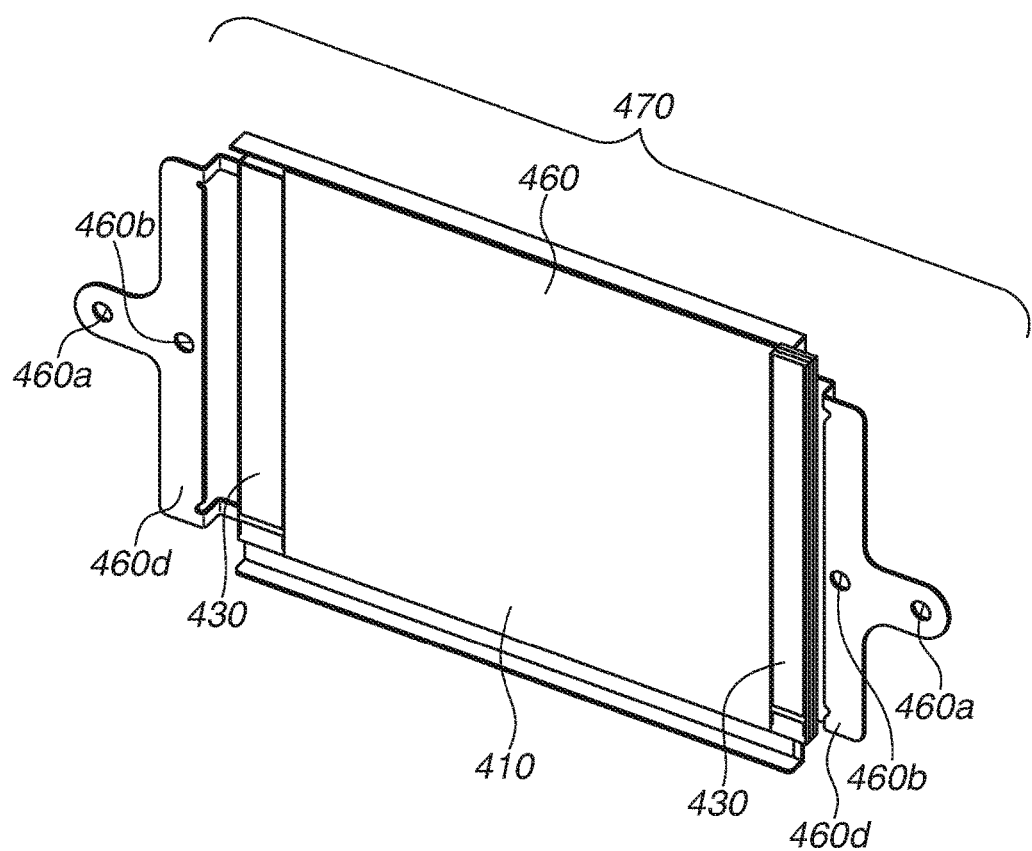
FIG. 6 is a perspective view illustrating a configuration of a vibration unit of the digital camera according to the first, second, third, and fourth example embodiments of the disclosure.

FIG. 6 is a perspective view illustrating the detailed configuration of the vibration unit 470. The vibration unit 470 includes at least the infrared cut filter 410, the piezoelectric element 430, and the holding member 460.

The holding member 460 is formed from a material with elasticity, such as metal, as a single component, and is provided with the positioning holes 460*a* and the clearance holes 460*b* for screws.

Furthermore, holding surfaces 460*c* (see FIG. 5) of the holding member 460 are firmly fixed to the infrared cut filter 410 at the vicinities of four corners thereof including node portions of vibration with the use of, for example, conductive adhesive.

Then, planar portions 460*d* are folded in the optical axis direction, which is parallel to the vibration of the infrared cut filter 410.

The piezoelectric element 430 is firmly fixed to the end portion of the rectangular infrared cut filter 410 with the use of, for example, adhesion. In the first example embodiment, two piezoelectric elements of the same shape in total are firmly fixed to the both ends of the infrared cut filter 410.

Figure 7:
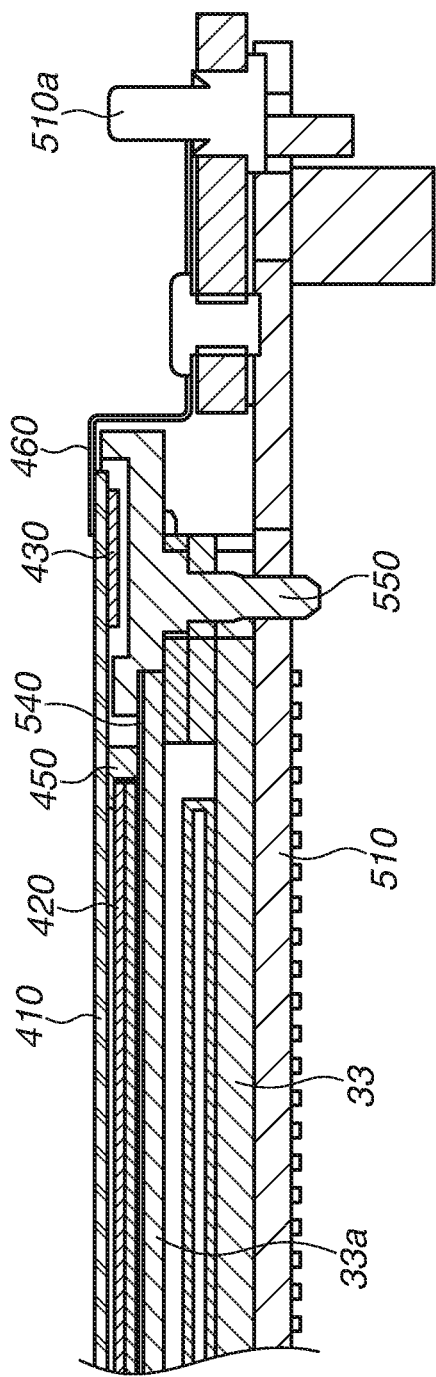
FIG. 7 is a sectional view taken along line X-X in FIG. 4.

FIG. 7 is a sectional view taken along line X-X in FIG. 4, which illustrates a part of the imaging unit 400. The subject side surface of the light-blocking member 540 abuts on the optical low-pass filter 420, and the operator side surface thereof abuts on the cover glass 33*a* of the image sensor 33.

The light-blocking member 540 has double-sided adhesive tapes firmly attached to the subject side and the operator side thereof, and the optical low-pass filter 420 is fixed to and held by the cover glass 33*a* of the image sensor 33 via the double-sided adhesive tapes of the light-blocking member 540.

With this, a space between the optical low-pass filter 420 and the cover glass 33*a* of the image sensor 33 is sealed by the light-blocking member 540 and is thus formed as a hermetically-closed space for preventing intrusion a foreign substance such as dust.

Furthermore, the subject side surface of the elastic member 450 abuts on the infrared cut filter 410, and the operator side surface thereof abuts on the optical low-pass filter 420.

Since the vibration unit 470 is urged toward the image sensor unit 500 by the spring property of the holding member 460, the elastic member 450 and the infrared cut filter 410 are in close contact with each other without a break, and the elastic member 450 and the optical low-pass filter 420 are also in close contact with each other without a break.

With this, a space between the infrared cut filter 410 and the optical low-pass filter 420 is sealed by the elastic member 450 and is thus formed as a hermetically-closed space for preventing intrusion of a foreign substance such as dust.

<Foreign Substance Removal Operation of Vibration Unit 470>

Next, a foreign substance removal operation of the vibration unit 470 is described.

The piezoelectric element driving circuit 111 applies a voltage with a predetermined frequency to the piezoelectric element 430, which is firmly fixed to the infrared cut filter 410, under the control of the MPU 100.

Then, the piezoelectric element 430 expands and contracts along the direction perpendicular to the optical axis, thus causing the infrared cut filter 410 to perform bending vibration.

The frequency of the voltage to be applied can be determined by the frequency sweep in the vicinity of an eigenmode resonance frequency of the infrared cut filter 410, so that the vibration efficiency can be improved.

While, usually, the foreign substance removal operation is performed in this way, when the LV display function is being performed, as mentioned above, noise may be superimposed on an LV display video image.

This is because a captured image signal readout operation of the image sensor 33 and a voltage application operation to the piezoelectric element 430 occur simultaneously.

Then, a high-voltage transformer noise or a ground (GNB) variation noise which occurs due to the voltage application is superimposed on a captured image signal passing from the image sensor 33 to the video signal processing circuit 104.

Therefore, if the foreign substance removal operation is performed at timing other than signal readout timing of the image sensor 33, simultaneous execution of the foreign substance removal operation is enabled without an influence of a noise on LV display.

<Timing of Foreign Substance Removal Operation>

Figure 8A:
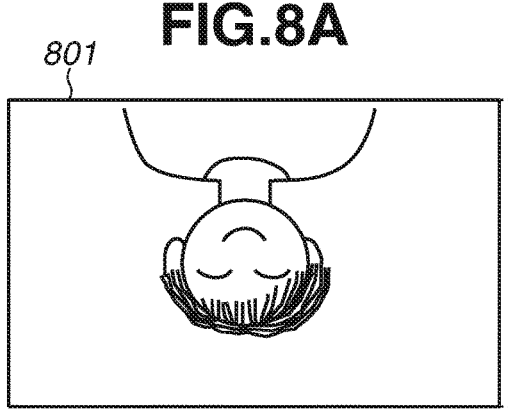
Figure 8B:
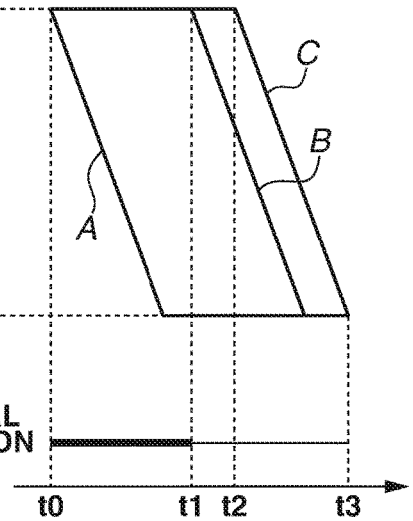

FIGS. 8A, 8B, and 8C are diagrams used to explain timing of an accumulation and readout operation of the image sensor 33 for LV display and timing of the foreign substance removal operation.

FIG. 8A illustrates a light-receiving area 801 the image sensor 33, which shows a subject image (upside down, left-right reversal) formed via the imaging lens 200 in an overlapping manner.

FIG. 8B is a timing chart during accumulation and readout performed by the image sensor 33. Line A indicates the start of accumulation, line B indicates the end of accumulation, and line C indicates the end of readout of data for one line. Accordingly, an interval between line A and line B is an accumulation period, and an interval between line B and line C is a readout period.

At line t0, the accumulation in the uppermost line of the image sensor 33 is started, and, at time t1, the accumulation is ended and, subsequently, the readout of pixel signals is started, in which image data for one line obtained by the image sensor 33 is read out while being converted into a digital signal by the A/D converter 36 on a pixel-by-pixel basis.

At time t2, the readout of all of the pixels for one line is ended. These operations are concurrently and sequentially performed for the respective lines, and, at time t3, the readout of pixels in the last line is ended.

With these processing operations, the accumulation and readout of a captured image signal for one frame of the LV image are completed.

The LV display is performed by repeating this accumulation and readout operation at timing corresponding to a moving image frame rate.

Furthermore, in the case of the LV display, it is difficult to read out all of the pixel lines from the viewpoint of time.

For example, in the case of a moving image frame rate of 30 frames per second (fps), readout from the image sensor 33 is performed while the lines in the vertical direction are thinned out into, for example, ⅓ and the lines in the horizontal direction are thinned out, for example, into ⅓, so that a readout time required for reading out one screen can be shortened.

FIG. 8C illustrates a driving state of the foreign substance removal operation, in which a thick line (time t0 to time t1) indicates the driving state and a thin line (time t1 to time t3) indicates a non-driving state.

This indicates that the voltage application to the piezoelectric element 430 is stopped during a time (time t1 to time t3) for readout of all of the lines of the image sensor in one frame and driving of the piezoelectric element 430 is performed during a time other than the time for readout.

Furthermore, hereinafter, a period between the time (time t1 to time t3) for readout of all of the lines of the image sensor 33 in this one frame and the time (time t1 to time t3) for readout of all of the lines of the image sensor 33 in the next one frame is referred to as a "blanking period".

In this way, the foreign substance removal operation is performed in a blanking period, which is other than the timing of signal readout from the image sensor 33, so that the LV display function and the dust removal function can be simultaneously performed without noise being superimposed on the LV display video image.

Furthermore, the timing of screen updating of the color liquid crystal monitor 19 which is based on the moving image frame rate in the present example embodiment is assumed to be performed during the foreign substance removal operation so as to avoid an influence on timing control over the image sensor 33 and the foreign substance removal operation.

<Procedure for Foreign Substance Removal Operation>

A procedure for the foreign substance removal operation of the digital camera according to the first example embodiment is described with reference to the flowchart of FIG. 9.

First, in step S601, when the main switch 43 of the camera body 1 is pressed, the MPU 100 powers on the camera body 1 to activate the camera body 1.

Next, in step S602, the MPU 100 performs an initial procedure at the time of activation of the camera body 1.

The initial procedure includes, for example, confirmation of the power source voltage level or any abnormality of switch (SW) systems included in the camera body confirmation of the presence or absence of a recording medium, confirmation of mounting of a lens, and initial settings for image capturing, and is performed for about 40 milliseconds (ms).

Here, in step S603, concurrently with the initial procedure, the MPU 100 starts a foreign substance removal operation using predetermined parameters.

In the first example embodiment, the predetermined parameters are assumed to include an applied voltage of 20 peak-to-peak voltage (Vpp), a frequency band of 50 kHz to 40 kHz, and a driving time of 100 ms.

After the initial procedure for 40 ms is completed, next, in step S604, the MPU 100 starts LV display to show a subject image on the color liquid crystal monitor 19 and enters an image capturing standby state.

LV display parameters as used herein are assumed to include a frame rate of 30 fps, and the number of lines read out of the image sensor 33 with respect to one screen is assumed to be thinned out to ⅓.

Here, since the foreign substance removal operation, which has been started in step S603, is still performed only for 40 ms and is in the process of being driven, after the LV display is started, simultaneous driving of the foreign substance removal operation and the LV display occurs.

Therefore, the MPU 100 switches the foreign substance removal operation to simultaneous drive control with the LV display in step S604.

In this way, after performing the operation for a predetermined time (in the first example embodiment, 100 ms), in step S605, the MPU 100 ends the foreign substance removal operation.

Furthermore, since the camera body 1 enters the image capturing standby state at step S604, when an image capturing instruction (pressing of the shutter button 7 by the user) is issued, the MPU 100 immediately ends the foreign substance removal operation and performs an image capturing operation.

<Timing Chart>

Next, the timing of operations in steps S601 to S605 illustrated in FIG. 9 is described in detail with reference to the timing chart of FIG. 10.

In the timing chart of FIG. 10, the horizontal direction corresponds to a time axis, which proceeds from left to right, and the vertical axis indicates on and off states of the respective operations, in which the upper line indicates "ON" and the lower line indicates "OFF".

The operations include an initial procedure operation 901 of the camera body 1 and a foreign substance removal operation 902.

The operations further include a captured image signal readout operation 903, in which one ON period corresponds to a readout operation for one frame of the LV image (time t1 to time t3 in FIG. 8B), which is described above with reference to FIGS. 8A, 8B, and 8C, and respective LV image frames are denoted by numbers F1 to F6.

Furthermore, in the first example embodiment, the number of readout lines in the image sensor 33 with respect to one frame or one screen of the LV image is assumed to be thinned out to ⅓ and a time of 13 ms is assumed to be required for readout of one screen.

The operations further include an LV liquid crystal display operation 904 performed on the color liquid crystal monitor 19, in which separator lines are drawn at respective display image updating timing points and respective intervals are denoted by numbers F1' to F5'.

The intervals F1' to F5' correspond to LV image frames F1 to F5, respectively, and an LV image frame corresponding to each interval is displayed on the color liquid crystal monitor 19.

Specific timing points 905 are denoted by p0 to p4 together with approximate elapsed times from timing point p0.

The timing chart is described along the time axis.

First, timing point p0, which is timing at which the main switch 43 is pressed and the camera body 1 is activated, corresponds to steps S601 to S603 illustrated in FIG. 9, in which the initial procedure operation 901 and the foreign substance removal operation 902 enter an ON state.

Next, timing point p1, which is timing at which the initial procedure is completed and the LV display is started, corresponds to step S604 illustrated in FIG. 9.

At this timing, the initial procedure operation 901 is turned off, the captured image signal readout operation 903 is first turned on to perform the LV display operation, and the foreign substance removal operation 902 is turned off.

Here, the captured image signal readout operation 903 is performed to read out a captured image signal of the first one image frame (F1) of the LV display, and, at the same time, the foreign substance removal operation 902 is turned off, because simultaneous driving with the LV display operation has occurred.

Next, at timing point p2, which is timing at which the captured image signal readout of one frame (F1) of the LV image is completed, the captured image signal readout operation 903 is turned off and the LV liquid crystal display operation 904 and the foreign substance removal operation 902 are turned on.

The LV image frame (F1) which has just been read out is displayed on the color liquid crystal monitor 19. If the operation sequence at timing point p2 is described more specifically, turning off of the captured image signal readout operation 903, turning on of the foreign substance removal operation 902, and turning on of the LV liquid crystal display operation 904 are performed in this order.

Next, at timing point p3, which is timing at which the captured image signal readout operation is restarted to acquire a next LV display image (F2), the captured image signal readout operation 903 is turned on and the foreign substance removal operation 902 is turned off.

At timing point p3 and subsequent timing points, the same process as at timing points p1 to p3 is repeated, so that the LV display and the foreign substance removal operation are simultaneously driven. With regard to the timing chart of FIG. 8C, a relationship of "t3−t1=p2−p1 and t1−t0=p3−p2" results.

Next, at timing point p4, which is timing at which the foreign substance removal operation is completed, the foreign substance removal operation 902 is turned off. With regard to FIG. 9, the timing point p4 corresponds to step S605, Subsequent timing points correspond to the image capturing standby state.

In the first example embodiment, in a case where an optical member is vibrated while a moving image is displayed, a control unit is configured to vibrate the optical member in a blanking period between two readout periods for reading out electric charge accumulated in an image sensor and not to vibrate the optical member in the readout periods.

In the first example embodiment, in a case where vibration of the optical member and displaying of the moving image are simultaneously performed, the control unit performs updating of frames of the moving image displayed by the display unit during the vibration of the optical member.

As described above, according to the first example embodiment, even when the LV display function and the dust removal function are simultaneously performed, a real-time and good-quality LV display video image can be provided without noise being superimposed on the LV display video image.

Furthermore, while, in the first example embodiment, a configuration in which bending vibration is excited at the infrared cut filter 410 is employed, a configuration in which bending vibration is excited at an optical low-pass filter formed by bonding a birefringent plate, a phase plate, and an infrared cut filter together, a single birefringent plate, or single phase plate can also be employed.

A procedure for a foreign substance removal operation a digital camera according to a second example embodiment is described with reference to the flowchart of FIG. 11.

Configurations of a camera body and an interchangeable lens in the second example embodiment are similar to those in the first example embodiment, and constituent elements common to those of the first example embodiment are assigned the respective same reference characters as those in the first example embodiment.

Furthermore, the foreign substance removal operation, which is described above with reference to FIG. 7 and FIGS. 8A to 8C, is the same as in the first example embodiment, and is, therefore, not repeated herein.

First, in step S951, when the main switch 43 of the camera body 1 is pressed, the MPU 100 powers on the camera body 1 to activate the camera body 1.

Next, in step S952, the MPU 100 performs an initial procedure at the time of activation of the camera body 1.

The initial procedure includes, for example, confirmation of the power source voltage level or any abnormality of switch (SW) systems included in the camera body 1, confirmation of the presence or absence of a recording medium, confirmation of mounting of a lens, and initial settings for image capturing, and is performed for about 40 ms.

Here, in step S953, concurrently with the initial procedure, the MPU 100 starts a foreign substance removal operation using predetermined parameters α.

In the second example embodiment, the predetermined parameters α are assumed to include an applied voltage of 20 Vpp, a frequency band of 50 kHz to 40 kHz, and a driving time of 40 ms.

After the foreign substance removal operation is completed and the initial procedure is also completed, next, in step S954, the MPU 100 starts LV display to show a subject image on the color liquid crystal monitor 19 and enters an image capturing standby state.

LV display parameters as used herein are assumed to be set in such a manner that the frame rate is 15 fps and the number of lines read out of the image sensor 33 with respect to one screen is thinned out to ⅕.

Next, in step S955, the MPU 100 performs a foreign substance removal operation using predetermined parameters β.

In the second example embodiment, the predetermined parameters β are assumed to include an applied voltage of 30 Vpp, a frequency band of 80 kHz to 70 kHz, and a driving time of 180 ms.

The purpose of changing the parameters for the foreign substance removal operation is described as follows.

In cameras allowing the user to confirm a subject image with the LV display, as in the digital camera in the second example embodiment, a time required from the time of activation of the camera to the time of the LV display is usually shortened as much as possible so as to enable the camera to quickly enter an image capturing standby state.

Therefore, a time required for an interval from the time of activation of the camera to the time of start of the LV display, which corresponds to step S953 in the second example embodiment, becomes short, and, in some cases, the foreign substance removal operation for such an interval may be unable to produce a sufficient dust removal effect.

Therefore, in the second example embodiment, in order to produce a further dust removal effect even after the entry to the image capturing standby state, the foreign substance removal operation is performed with new parameters.

Figure 11:
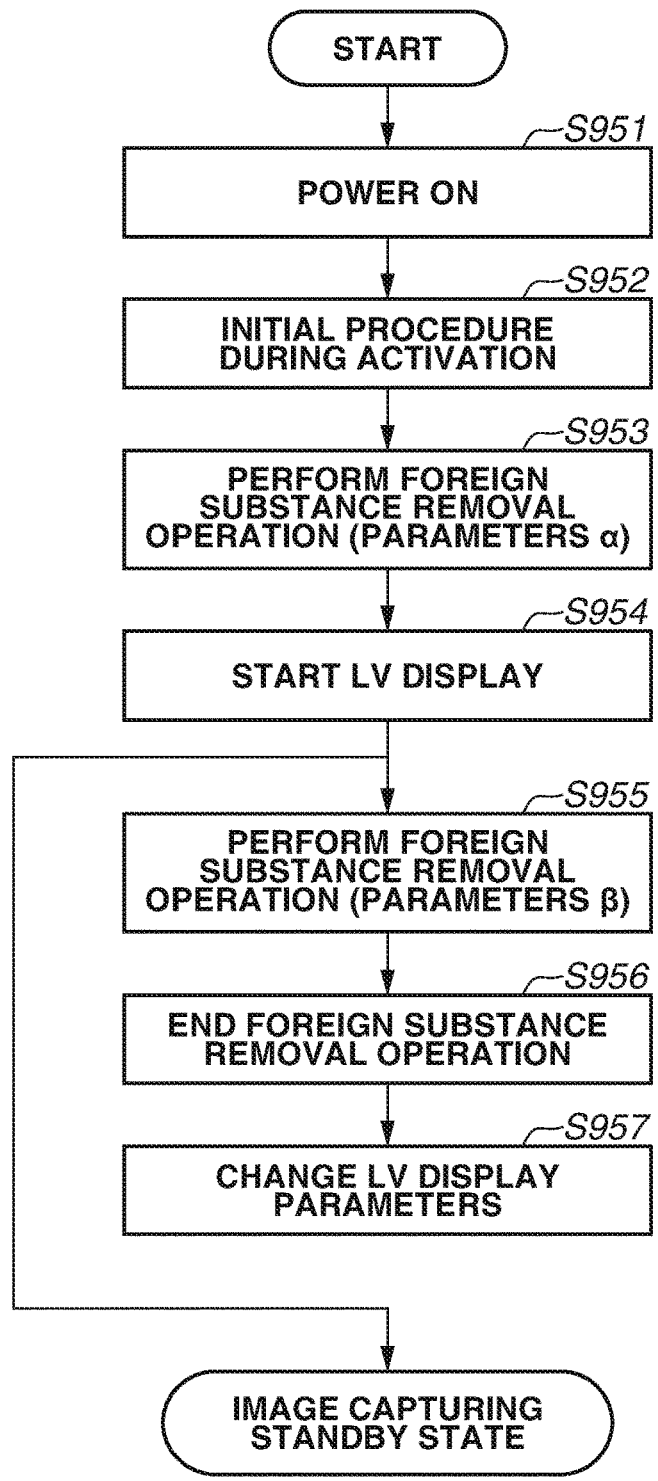
FIG. 11 is a flowchart illustrating a foreign substance removal operation in the second example embodiment of the disclosure.

The description refers back to FIG. 11. When, in step S956, the foreign substance removal operation started in step S955 is ended, then in step S957, the MPU 100 changes LV display parameters in such a manner that the frame rate is 30 fps and the number of lines read out of the image sensor 33 with respect to one screen is thinned out to ⅓.

With this, an LV display video image obtained in and after step S957 is larger in the number of pixels per one frame of the moving image and higher in the moving image frame rate than that obtained in step S955, thus becoming a smoother video image.

In other words, in step S955, LV display is performed with coarse display setting so as to prioritize the foreign substance removal operation, and, in step S957, which is after the foreign substance removal operation is ended, LV display is performed with optimum display setting.

Next, the timing of operations in steps S952 to S957 illustrated in FIG. 11 is described in detail with reference to the timing chart of FIG. 12.

Figure 12:
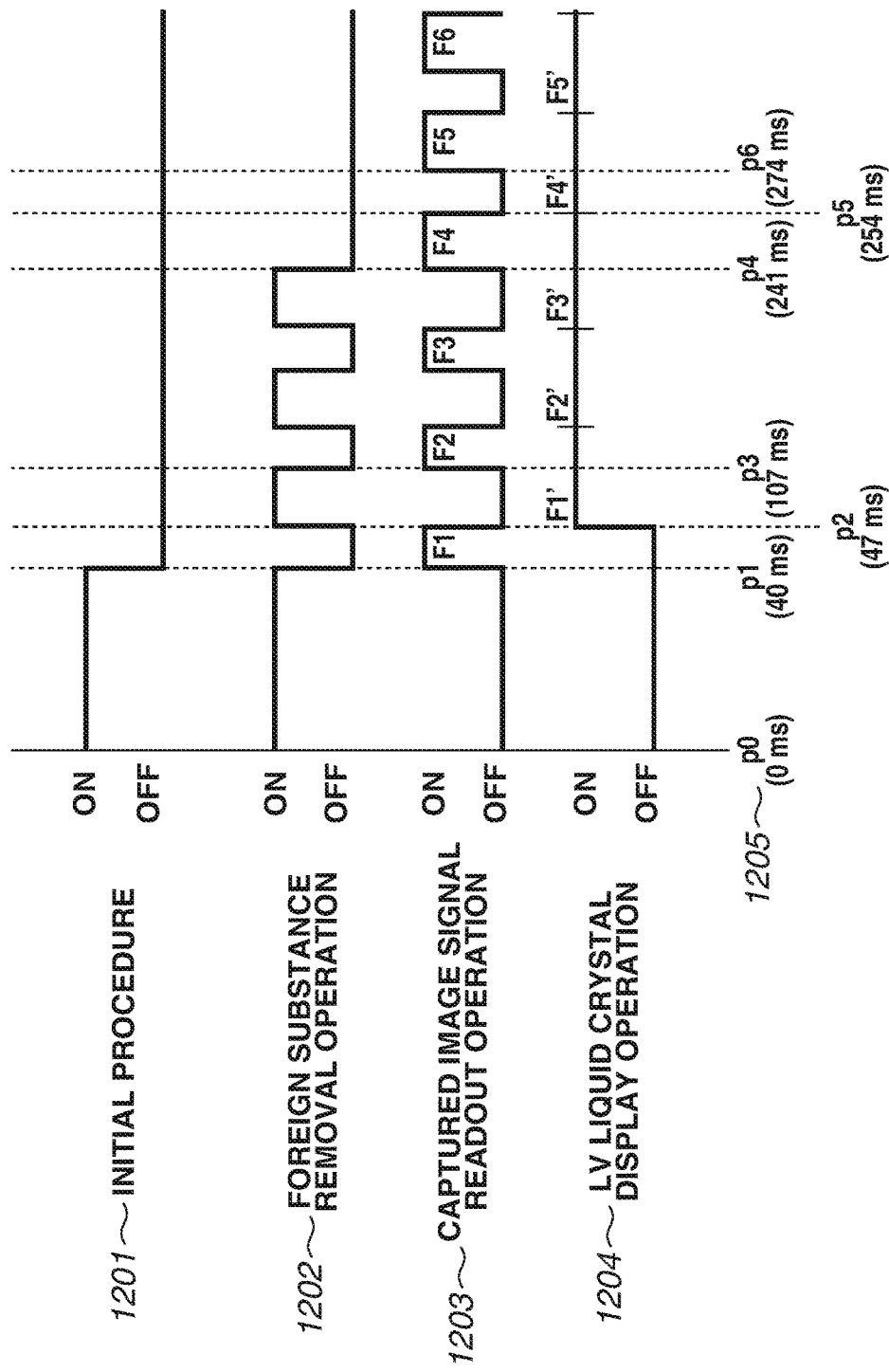
FIG. 12 is a timing chart illustrating the foreign substance removal operation in the second example embodiment of the disclosure.

In the timing chart of FIG. 12, the horizontal direction corresponds to a time axis, which proceeds from left to right, and the vertical axis indicates on and off states of the respective camera operations, in which the upper line indicates "ON" and the lower line indicates "OFF".

The camera operations include an initial procedure operation 1201 of the camera body 1 and a foreign substance removal operation 1202.

The camera operations further include a captured image signal readout operation 1203, in which one ON period corresponds to a readout operation for one frame of the LV image (time t1 to time t3 in FIG. 8B), which is described above with reference to FIGS. 8A, 8B, and 8C, and respective LV image frames are denoted by numbers F1 to F6.

Furthermore, in the second example embodiment, the readout time required for readout from the image sensor 33 with respect to one frame or one screen of the LV image is assumed to be 13 ms when the number of readout lines is thinned out to ⅓ and to be 7 ms when the number of readout lines is thinned out to ⅕.

The camera operations further include an LV liquid crystal display operation 1204 performed on the color liquid crystal monitor 19, in which separator lines are drawn at respective display image updating timing points and respective intervals are denoted by numbers F1' to F5'.

The intervals F1' to F5' correspond to LV image frames F1 to F5, respectively, and an LV image frame corresponding to each interval is displayed on the color liquid crystal monitor 19. Specific timing points 1205 are denoted by p0 to p5 together with approximate elapsed times from timing point p0.

The timing chart is described along the time axis.

First, timing point p0, which is timing at which the main switch 43 is pressed and the camera body 1 is activated, corresponds to steps S951 to S953 illustrated in FIG. 11, in which the initial procedure operation 1201 and the foreign substance removal operation 1202, which is performed with the parameters α, enter an ON state.

Next, timing point p1, which is timing at which the foreign substance removal operation and the initial procedure are completed and the LV display is started, corresponds to step S954 illustrated in FIG. 11.

At this timing, the initial procedure operation 1201 and the foreign substance removal operation 1202 are turned off, and the captured image signal readout operation 1203 is turned on. Here, while the foreign substance removal operation 1202 has been started with the parameters α, the foreign substance removal operation 1202 is turned off, because simultaneous driving with the LV display operation has occurred.

Next, at timing point p2, which is timing at which the captured image signal readout operation 1203 for reading out a captured image signal of the first one frame (F1) of the LV image is completed in 7 ms, the captured image signal readout operation 1203 is turned off and the LV liquid crystal display operation 1204 and the foreign substance removal operation 1202, which is performed with the parameters β, are turned on.

The LV image frame (F1) which has just been read out is displayed on the color liquid crystal monitor 19.

If the operation sequence at timing point p2 is described more specifically, turning off of the captured image signal readout operation 1203, turning on of the foreign substance removal operation 1202, and turning on of the LV liquid crystal display operation 1204 are performed in this order.

Next, at timing point p3, which is timing at which the captured image signal readout operation 1203 is restarted to acquire a next LV display image (F2), the captured image signal readout operation 1203 is turned on and the foreign substance removal operation 1202 is turned off.

At timing point p3 and subsequent timing points, the same process as at timing points p1 to p3 is repeated, so that the LV display and the foreign substance removal operation are simultaneously driven. With regard to the timing chart of FIG. 8C, a relationship of "t3−t1=p2−p1 and t1−t0=p3−p2" results.

Next, timing point p4, which is timing at which the foreign substance removal operation is completed, corresponds to steps S956 and S957 illustrated in FIG. 11.

At this timing, the foreign substance removal operation 1202 is turned off and the captured image signal readout operation 1203 is turned on.

Here, the MPU 100 changes LV display parameters in such a manner that the frame rate is 30 fps and the number of lines read out of the image sensor 33 with respect to one screen is thinned out to ⅓.

Next, timing point p5 is timing at which the captured image signal readout operation for reading out a captured image signal of one frame (F4) is completed in 13 ms.

Next, timing point p6 is timing at which the captured image signal readout operation 1203 is restarted to acquire a next LV display image (F5), and the time from timing point p4 to timing point p6 becomes 33 ms based on the frame rate of the LV display. Timing point p6 and subsequent timing points correspond to the image capturing standby state.

In the second example embodiment, in a case where an optical member is vibrated while a moving image is displayed, a control unit makes a frame rate of displaying of the moving image lower than in a case where the optical member is not vibrated while the moving image is displayed.

In the second example embodiment, in a case where the optical member is vibrated while the moving image is displayed, the control unit makes a period of accumulating the electric charge longer than in a case where the optical member is not vibrated while the moving image is displayed.

In the second example embodiment, in a case where the optical member is vibrated while the moving image is displayed, the control unit makes the number of readout lines read out in the readout period smaller than in a case where the optical member is not vibrated while the moving image is displayed.

As described above, according to the second example embodiment, even when the LV display function and the dust removal function are simultaneously performed, a real-time and good-quality LV display video image can be provided.

A procedure for a foreign substance removal operation of a digital camera according to a third example embodiment is described with reference to FIGS. 13A and 13B to FIG. 16.

Configurations of a camera body and an interchangeable lens in the third example embodiment are similar to those in the first example embodiment, and constituent elements common to those of the first example embodiment are assigned the respective same reference characters as those in the first example embodiment.

As mentioned above, the cause for which noise is superimposed on an LV display image when the LV display function and the foreign substance removal operation are simultaneously performed is that noise caused by the voltage application to the piezoelectric element 430 is superimposed on a signal read out of the image sensor 33.

However, at this time, the noise level varies according to the applied voltage frequency to the piezoelectric element 430 or the high or low level of the voltage.

The influence of the noise level due to the frequency of the foreign substance removal operation is described with reference to the timing charts of FIGS. 13A and 13E.

Figure 13A:
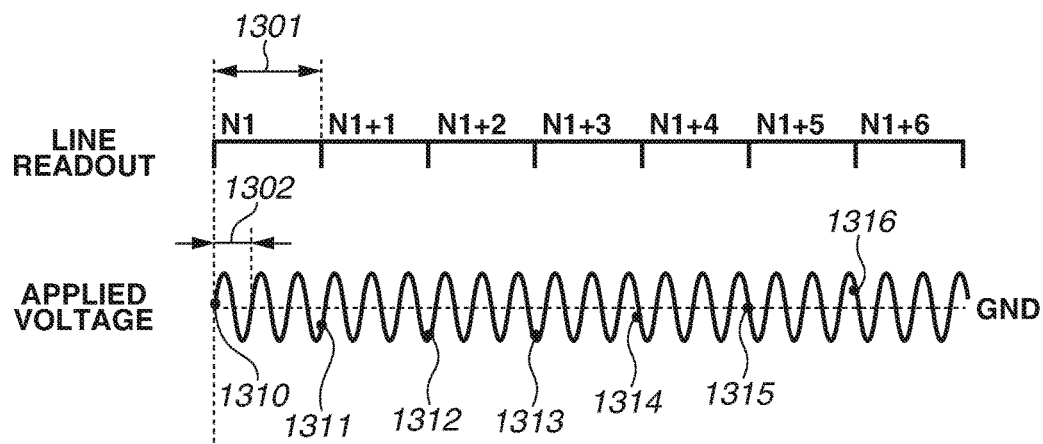
FIGS. 13A and 13B are diagrams illustrating a relationship between applied frequencies and noise levels in the third example embodiment of the disclosure.

In the timing chart of FIG. 13A, the horizontal direction corresponds to a time axis, which proceeds from left to right. Row "Line Readout" indicates line readout timing of the image sensor 33, in which the frequency thereof is assumed to be 30 kHz.

Row "Applied Voltage" indicates the amplitude of the applied voltage to the piezoelectric element 430, which is expressed by a sine wave as a change in positive and negative voltages with ground. (GND) used as the reference and in which the frequency thereof is assumed to be 63 kHz.

An interval 1301 indicates one cycle of line readout, and an interval 1302 indicates one cycle of the applied voltage to the piezoelectric element 430.

Each of line readout timing, points "N1" to "N1+6" indicates the line number of a horizontal line from which electric charge is read out of the image sensor 33 in order of readout.

Points 1310 to 1316 indicate states of the applied voltages to the piezoelectric element 430, which are noise sources at the respective line readout timing points N1 to N1+6 of the image sensor 33.

Since the noise level of noise which is superimposed on electric charge read out of the image sensor 33 depends on the amplitude amount of the applied voltage to the piezoelectric element 430 from the voltage GND, the readout lines N1 to N1+6 are affected by the respective different influences of noise.

For example, with regard to the line N1+5, the state of the applied voltage to the piezoelectric element 430 corresponds to the vicinity of GND as indicated by point 1315. Therefore, the influence of noise is small. On the other hand, with regard to the line N1+2, since the applied voltage amplitude corresponds to the vicinity of a peak as indicated by point 1312, the influence of noise is large.

Thus, FIG. 13A indicates that the degree of influence of noise on a captured image signal varies with the state of the applied voltage to the piezoelectric element 430 for each readout line.

Next, the noise level being varied by changing the frequency applied to the piezoelectric element 430 is described with reference to FIG. 13B.

Figure 13B:
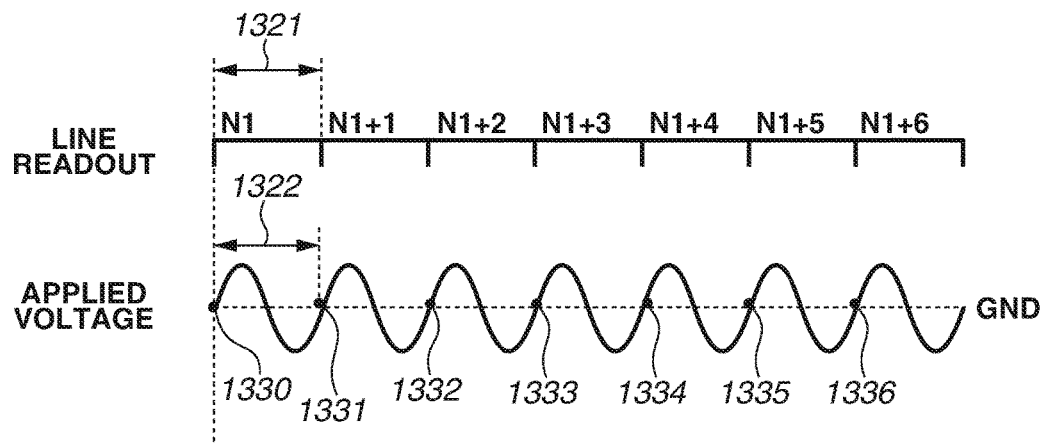

In FIG. 13B, row "Line Readout" indicates line readout timing of the image sensor 33, in which the frequency thereof is assumed to be 30 kHz.

Row "Applied voltage" indicates the amplitude of the applied voltage to the piezoelectric element 430, which is expressed by a sine wave as a change in positive and negative voltages with GND used as the reference and in which the frequency thereof is assumed to be 30 kHz.

An interval 1321 indicates one cycle of line readout, and an interval 1322 indicates one cycle of the applied voltage to the piezoelectric element 430.

Each of line readout timing points "N1" to "N1+6" indicates the line number of a horizontal line from which electric charge is read out of the image sensor 33 in order of readout.

Points 1330 to 1336 indicate states of the applied voltages to the piezoelectric element 430, which are noise sources at the respective line readout timing points N1 to N1+6 of the image sensor 33.

As mentioned above, while the noise level of noise which is superimposed on electric charge read out of the image sensor 33 depends on the amplitude amount of the applied voltage to the piezoelectric element 430 from the voltage GND, each of the points 1330 to 1336 corresponds to the vicinity of GND.

Therefore, the points 1330 to 1336 indicate that the lines for the readout captured image signals N1 to N1+6 corresponding thereto have extremely small noise levels.

In other words, it is suggested that performing applied voltage control as illustrated in FIG. 13B enables minimizing the influence of noise on a captured image signal even when simultaneously performing the LV display function and the foreign substance removal function.

Furthermore, while, here, the line readout frequency of the image sensor 33 and the applied voltage frequency to the piezoelectric element 430 are set to the same value, the applied voltage frequency can be set to an integral multiple of the line readout frequency.

Moreover, the noise level can be decreased by lowering the applied voltage to the piezoelectric element 430.

However, a foreign substance removal operation using the frequency determined based on the line readout frequency of the image sensor 33 or a low applied voltage may be unable to produce a sufficient dust removal effect. Therefore, a foreign substance removal operation according to the third example embodiment is described with reference to FIGS. 14A, 14B, and. 14C.

FIGS. 14A, 14B, and 14C are diagrams used to explain timing of an accumulation and readout operation of the image sensor 33 for LV display and timing of the foreign substance removal operation.

FIG. 14A illustrates a light-receiving area 1401 of the image sensor 33, which shows a subject image (upside down, left-right reversal) formed via the imaging lens 200 in an overlapping manner.

FIG. 14B is a timing chart during accumulation and readout performed by the image sensor 33. Line A indicates the start of accumulation, line B indicates the end of accumulation, and line C indicates the end of readout of data for one line.

Accordingly, an interval between line A and line B is an accumulation period, and an interval between line B and line C is a readout period.

At line to, the accumulation in the uppermost line of the image sensor 33 is started, and, at time t1, the accumulation is ended and, subsequently, the readout of pixel signals is started, in which image data for one line obtained by the image sensor 33 is read out while being converted into a digital signal by the A/D converter 36 on a pixel-by-pixel basis.

At time t2, the readout of all of the pixels for one line is ended. These operations are concurrently and sequentially performed for the respective lines at predetermined frequency timing, and, at time t3, the readout of pixels in the last line is ended.

With these processing operations, the accumulation and readout of a captured image signal for one frame of the LV image are completed. The LV display is performed by repeating this accumulation and readout operation at timing corresponding to a moving image frame rate.

Furthermore, in the case of the LV display, it is difficult to read out all of the pixel lines from the viewpoint of time.

For example, in the case of a moving image frame rate of 30 fps, readout from the image sensor 33 is performed while the lines in the vertical direction are thinned out into, for example, ⅓ and the lines in the horizontal direction are thinned out, for example, into ⅓, so that a readout time required for reading out one screen can be shortened.

FIG. 14C illustrates drive frequencies of the foreign substance removal operation, indicating that the foreign substance removal operation in an interval f1 is driven at a frequency fα and the foreign substance removal operation in an interval f2 is driven at a frequency fβ.

The frequency fα is a predetermined frequency suited to the foreign substance removal operation, and is assumed here to be 130 kHz.

The frequency fβ is a frequency corresponding to the line readout frequency of the image sensor 33, and is assumed here to be the same, 30 kHz.

Thus, in a blanking period. (time t1 to time t3), the foreign substance removal operation is performed at a frequency suited for preventing or reducing nose to a readout signal (frequency fβ). In a time other than the blanking period, the foreign substance removal operation is performed at a frequency suited to the foreign substance removal operation (frequency fα).

In this way, frequencies of the foreign substance removal operation are switched according to the timing of signal readout from the image sensor 33 and the blanking period.

This enables simultaneously performing the LV display function and the dust removal function without noise being superimposed on the LV display video image and without the dust removal performance being deteriorated.

Furthermore, while, here, only the frequency is changed, the applied voltage of the foreign substance removal operation can be changed according to the interval (time t0 to time t1) associated with the frequency f1 and the interval (time t1 to time t3) associated with the frequency f2.

Moreover, the timing of screen updating of the color liquid crystal monitor 19 which is based on the moving image frame rate in the present example embodiment is assumed to be performed concurrently with the foreign substance removal operation.

A procedure for the foreign substance removal operation of the digital camera according to the third example embodiment is described with reference to the flowchart of FIG. 15.

First, in step S1501, when the main switch 43 the camera body 1 is pressed, the MPU 100 powers on the camera body 1 to activate the camera body 1.

Next, in step S1502, the MPU 100 performs an initial procedure at the time of activation of the camera body 1.

The initial procedure includes, for example, confirmation of the power source voltage level or any abnormality of switch (SW) systems included in the camera body 1, confirmation of the presence or absence of a recording medium, confirmation of mounting of a lens, and initial settings for image capturing, and is performed for about 40 ms.

Here, in step S1503, concurrently with the initial procedure, the MPU 100 starts a foreign substance removal operation using predetermined parameters.

In the third example embodiment, the predetermined parameters are assumed to include an applied voltage of 20 Vpp, a frequency band of 130 kHz to 110 kHz (hereinafter, this frequency band being referred to as "fα"), and a driving time of 100 ms.

After the initial procedure for 40 ms is completed, next, in step S1504, the MPU 100 starts LV display to show a subject image an the color liquid crystal monitor 19 and enters an image capturing standby state.

LV display parameters as used wherein are assumed to include a frame rate of 30 fps, and the number of lines read out of the image sensor 33 with respect to one screen is assumed to be thinned out to ⅓. Then, the readout line frequency is assumed to be 30 kHz ((hereinafter, this frequency being referred to as "fβ")

Here, since the foreign substance removal operation, which has been started in step S1503, is still performed only for 40 ms and is in the process of being driven, after the LV display is started, simultaneous driving of the foreign substance removal operation and the LV display occurs.

Therefore, the MPU 100 switches the foreign substance removal operation to simultaneous drive control with the LV display in step S1504.

In this way, after performing the operation for a predetermined time (in the third example embodiment, 100 ms), in step S1505, the MPU 100 ends the foreign substance removal operation.

Furthermore, since the camera body 1 enters the image capturing standby state at step S1504, when an image capturing instruction (pressing of the shutter button 7 by the user) is issued, the MPU 100 immediately ends the foreign substance removal operation and performs an image capturing operation.

Next, the timing of operations in steps S1501 to S1505 illustrated in FIG. 15 is described in detail with reference to the timing chart of FIG. 16.

In the timing chart of FIG. 16, the horizontal-direction corresponds to a time axis, which proceeds from left to right, and the vertical axis indicates on and off states of the respective operations, in which the upper line indicates "ON" and the lower line indicates "OFF".

The operations include an initial procedure operation 1601 of the camera body 1 and a foreign substance removal operation 1602, in which the drive frequencies in the respective timing intervals are denoted by fα and fβ.

The operations further include a captured image signal readout operation 1603, in which one ON period corresponds to a readout operation for one frame of the LV image (time t1 to time t3 in FIG. 14B), which is described above with reference to FIGS. 14A, 14B, and 14C, and respective LV image frames are denoted by numbers F1 to F6.

Furthermore, in the third example embodiment, the number of readout lines in the image sensor 33 with respect to one frame or one screen of the LV image is assumed to be thinned out to ⅓ and a time of 13 ms is assumed to be required for readout of one screen.

The operations further include an LV liquid crystal display operation 1604 performed on the color liquid crystal monitor 19, in which separator lines are drawn at respective display image updating timing points and respective intervals are denoted by numbers F1' to F5'.

The intervals F1' to F5' correspond to LV image frames F1 to F5, respectively, and an LV image frame corresponding to each interval is displayed on the color liquid crystal monitor 19.

Specific timing points 1605 are denoted by p0 to p4 together with approximate elapsed times from timing point p0.

The timing chart is described along the time axis. First, timing point p0, which is timing at which the main switch 43 is pressed and the camera body 1 is activated, corresponds to steps S1501 to S1503 illustrated in FIG. 15, in which the initial procedure operation 1601 and the foreign substance removal operation 1602 enter an ON state.

Next, timing point p1, which is timing at which the initial procedure is completed and the LV display is started, corresponds to step S1504 illustrated in FIG. 15.

At this timing, the initial procedure operation 1601 is turned off, the captured image signal readout operation 1603 is first turned on to perform the LV display operation, and the drive frequency of the foreign substance removal operation 1602 becomes "fβ". Here, the captured image signal readout operation 1603 is performed to read out a captured image signal of the first one image frame (F1) of the LV display.

At the same time, the frequency of the foreign substance removal operation 1602 is changed, because simultaneous driving with the LV display operation has occurred.

Next, timing point p2 is timing at which the captured image signal readout of one frame (F1) of the LV image is completed.

At this timing, the captured image signal readout operation 1603 is turned off, the LV liquid crystal display operation 1604 is turned on, and the frequency of the foreign substance removal operation 1602 becomes "fα". The LV image frame (F1) which has just been read out is displayed on the color liquid crystal monitor 19.

If the operation sequence at timing point p2 is described more specifically, turning off of the captured image signal readout operation 1603, changing of the frequency of the foreign substance removal operation 1602, and turning on of the LV liquid crystal display operation 1604 are performed in this order.

Next, at timing point p3, which is timing at which the captured image signal readout operation is restarted to acquire a next LV display image (F2), the captured image signal readout operation 1603 is turned on and the frequency of the foreign substance removal operation 1602 becomes "fβ".

At timing point p3 and subsequent timing points, the same process as at timing points p1 to p3 is repeated, so that the LV display and the foreign substance removal operation are simultaneously driven according to timing of the captured image signal readout while the frequency is switched between "fα" and "fβ".

With regard to the timing chart of FIG. 14C, a relationship of "t3−t1=p2−p1 and t1−t0=p3−p2" results.

Next, at timing point p4, which is timing at which the foreign substance removal operation is completed, the foreign substance removal operation 1602 is turned off. With regard to FIG. 15, the timing point p4 corresponds to step S1505, Subsequent timing points correspond to the image capturing standby state.

Furthermore, while, here, the frequency of the foreign substance removal operation is switched, the applied voltage can be switched or both the frequency and the applied voltage can be switched.

Moreover, as a more suitable aspect, for example, the foreign substance removal driving parameters, the LV display frame rate, and the number of lines of readout from the image sensor 33 can be changed between when the foreign substance removal operation is performed simultaneously with the LV display and when it is not.

In the third example embodiment, when vibrating an optical member during displaying of a moving image, a control unit performs first drive control to set the drive frequency of a vibration unit to an integral multiple of a readout cycle of the readout period for reading out electric charge accumulated in an image sensor.

Furthermore, when vibrating the optical member during displaying of a moving image, the control unit performs second drive control to set the drive voltage of the vibration unit smaller than a predetermined value.

Not only one of the first drive control and the second drive control but also both the first drive control and the second drive control can be performed.

As described above, according to the third. Example embodiment, even when the LV display function and the dust removal function are simultaneously performed, a good-quality LV display video image can be provided without noise being superimposed on the LV display video image and without the dust removal performance being deteriorated.

Furthermore, in the third example embodiment, a configuration in which bending vibration is excited at the infrared cut filter 410 is employed.

However, a configuration in which bending vibration is excited at an optical low-pass filter formed by bonding a birefringent plate, a phase plate, and an infrared cut filter together, a single birefringent plate, or single phase plate can also be employed.

A procedure for a foreign substance removal operation of a digital camera according to a fourth example embodiment is described with reference to FIG. 17 to FIG. 19. In the fourth example embodiment, constituent elements common to those of the first example embodiment are assigned the respective same reference characters as those the first example embodiment.

Figure 17:
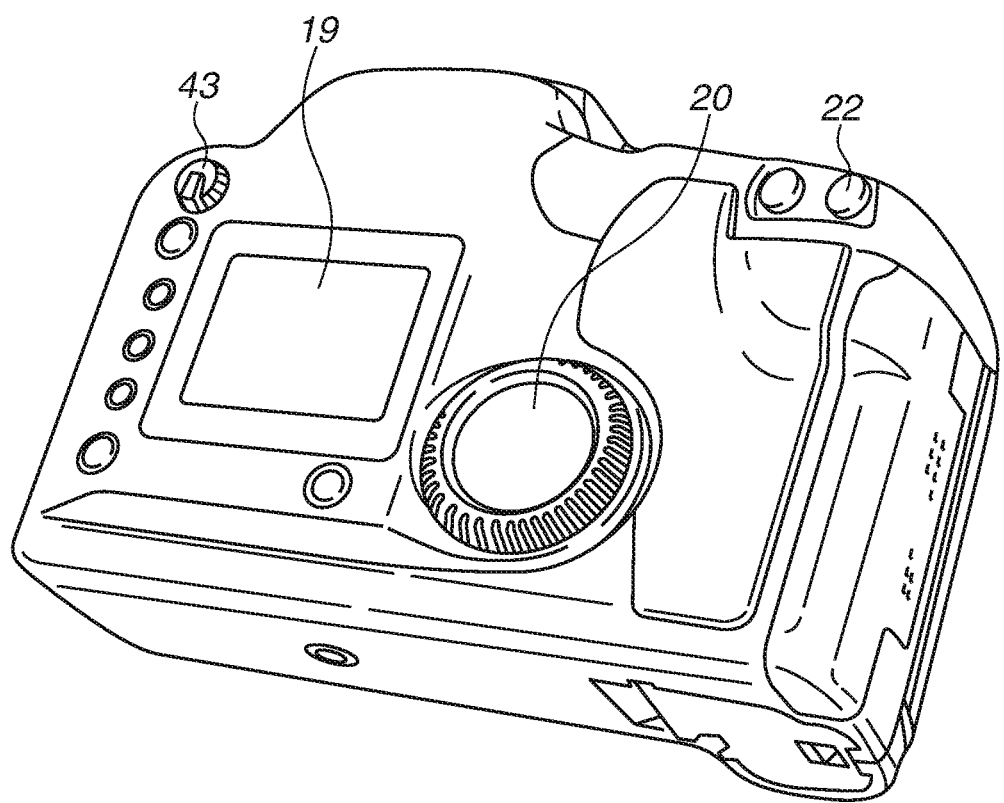
FIG. 17 is a back-side perspective view of the digital camera according to the fourth example embodiment of the disclosure.

FIG. 17 is a perspective view as viewed from the back side of a camera configured with a camera body and an interchangeable lens according to the fourth example embodiment. Furthermore, a front view of the camera body is the same as that of FIG. 1.

The color liquid crystal monitor 19, the subsidiary operation dial 20, and the main switch 43 are similar to those illustrated in FIG. 2, and are, therefore, omitted from description.

A moving image recording button 22 is used to perform operations to start and end recording of a moving image.

The procedure for the foreign substance removal operation of the digital camera according to the fourth example embodiment is described with reference to the flowchart of FIG. 18.

First, in step S1801, when the main switch 43 of the camera body 1 is pressed, the MPU 100 powers on the camera body 1 to activate the camera body 1.

Next, in step S1802, the MPU 100 performs an initial procedure at the time of activation of the camera body 1.

The initial procedure includes, for example, confirmation of the power source voltage level or any abnormality of switch (SW) systems included in the camera body 1, confirmation of the presence or absence of a recording medium, confirmation of mounting of a lens, and initial settings for image capturing.

The initial procedure is performed for about 40 ms.

Here, in step S1803, concurrently with the initial procedure, the MPU 100 starts a foreign substance removal operation using predetermined parameters.

In the fourth example embodiment, the predetermined parameters are assumed to include an applied voltage of 20 Vpu, a frequency band of 50 kHz to 40 kHz, and a driving time of 166 ms.

After the initial procedure for 40 ms is also completed, next, in step S1804, the MPU 100 starts LV display to show a subject image on the color liquid crystal monitor 19 and enters an image capturing standby state.

LV display parameters as used herein are assumed to be set in such a manner that the frame rate is 30 fps and the number of lines read out of the image sensor 33 with respect to one screen is thinned out to ⅓.

In step S1808, the MPU 100 determines whether the moving image recording button 22 is pressed during the image capturing standby state.

If it is determined that the moving image recording button 22 is pressed (YES in step S1808), then in step S1805, the MPU 100 records moving image data temporarily stored in the buffer memory 37 on the memory 39, thus starting moving image recording.

Here, moving image recording is assumed to be started after the image capturing standby state for 66 ms.

Here, since the foreign substance removal operation, which has been started in step S1803, is still performed only for 106 ms and is in the process of being driven.

Therefore, the MPU 100 switches the foreign substance removal operation to simultaneous drive control with moving image recording so as to prevent noise from entering a recorded moving image.

In this way, after performing the operation for a predetermined time (in the fourth example embodiment, 166 ms), in step S1806, the MPU 100 ends the foreign substance removal operation.

Then, when the moving image recording button 22 is re-pressed, in step S1807, the MPU 100 ends the moving image recording.

Next, the timing of operations in steps S1801 to S1807 illustrated in FIG. 18 is described in detail with reference to the timing chart of FIG. 19.

In the timing chart of FIG. 19, the horizontal direction corresponds to a time axis, which proceeds from left to right, and the vertical axis indicates on and off states of the respective operations, in which the upper line indicates "ON" and the lower line indicates "OFF".

The operations include an initial procedure operation 1901 of the camera body 1 and a foreign substance removal operation 1902.

The operations further include a captured image signal readout operation 1903, in which one ON period corresponds to a readout operation for one frame of the LV image (time t1 to time t3 in FIG. 8B), which is described above with reference to FIGS. 8A, 8B, and 8C, and respective LV image frames are denoted by numbers F1 to F6.

In the fourth example embodiment, this LV image frame is used as one frame of a moving image for moving image recording, and is, therefore, referred to as a "moving image frame". The number of readout lines in the image sensor 33 with respect to one frame of the moving image is assumed to be thinned out to ⅓ and a time of 13 ms is assumed to be required for readout of one screen.

The operations further include an LV liquid crystal display operation 1904 performed on the color liquid crystal monitor 19, in which separator lines are drawn at respective display image updating timing points and respective intervals are denoted by numbers F1' to F6'.

The intervals F1' to F6' correspond to moving image frames F1 to F6, respectively, and a moving image frame corresponding to each interval is displayed on the color liquid crystal monitor 19.

The operations further include a moving image recording operation 1905, in which separator lines are drawn at respective timing points at which a moving image is recorded on the memory 39 and respective intervals are denoted by numbers F3+ to F6+.

The intervals F3+ to F6+ correspond to the moving image frames F3 to F6, respectively.

Specific timing points 1906 are denoted by p0 to p8 together with approximate elapsed times from timing point p0.

The timing chart is described along the time axis.

First, timing point p0 is timing at which the main switch 43 is pressed and the camera body 1 is activated.

The timing point p0 corresponds to steps S1801 to S1803 illustrated in FIG. 18, in which the initial procedure operation 1901 and the foreign substance removal operation 1902 enter an ON state.

Next, timing point p1, which is timing at which the initial procedure is completed and the LV display is started, corresponds to step S1804 illustrated in FIG. 18.

At this timing, the initial procedure operation 1901 is turned off and the captured image signal readout operation 1903 is turned on to perform the LV display operation.

Here, the captured image signal readout operation 1903 is performed to read out a captured image signal of the first moving image frame (F1) of the LV display.

Next, at timing point p2, which is timing at which the captured image signal readout of the moving image frame (F1) is completed, the captured image signal readout operation 1903 is turned off.

The moving image frame (F1) which has just been read out is displayed on the color liquid crystal monitor 19.

Next, at timing point p3, which is timing at which the captured image signal readout operation is restarted to acquire a next moving image frame (F2), the captured image signal readout operation 1903 is turned on.

At timing point p3 and subsequent timing points, the same process as at timing points p1 to p3 is repeated, so that the LV display and the foreign substance removal operation are simultaneously driven until timing point p4.

Next, timing point p4, which is timing at which the moving image recording operation 1905 is started, corresponds to step S1805 illustrated in FIG. 18.

At this timing, the captured image signal readout operation 1903 and the moving image recording operation 1905 are turned on, and the foreign substance removal operation 1902 is turned off.

The reason why the foreign substance removal operation 1902 is turned off is that simultaneous driving with the moving image recording operation has occurred. The captured image signal readout operation 1903 is performed to read a moving image frame (F3).

Next, at timing point p5, reading of the moving image frame (F3) is completed. At this timing, the captured image signal readout operation 1903 is turned off and the foreign substance removal operation 1902 is turned on.

The LV image frame (F3) is recorded as one moving image frame on the memory 39. Here, the LV image frame (F3) is an image read when the foreign substance removal operation is in an off state.

Therefore, the LV image frame (F3) is a moving image free from noise unlike the moving image frames (F1) and (F2).

Next, timing point p6 is timing at which a next moving image frame (F4) is acquired.

Therefore, the timing point p6 is timing at which the captured image signal readout operation is restarted, so that the captured image signal readout operation 1903 is turned on and the foreign substance removal operation 1902 is turned off.

At timing point p6 and subsequent timing points, the same process as at timing points p4 to p6 is repeated, so that the moving image recording operation, the foreign substance removal operation, and the LV display are simultaneously driven.

Next, timing point p7, which is timing at which the foreign substance removal operation is completed, corresponds to step S1806 illustrated in FIG. 18.

At this timing, the foreign substance removal operation 1902 is turned off and the foreign substance removal operation 1903 is turned on.

Next, timing point p8 is timing at which reading of a next moving image frame (F6), updating of a moving image frame of the LV display, and recording of the moving image frame (F6) are completed.

After that, although not illustrated, the same operation as at timing points p7 to p8 is continued until ending of the moving image recording operation, which corresponds to step S1807 illustrated in FIG. 18.

As described above, according to the fourth example embodiment, even when the moving image recording function and the dust removal function are simultaneously performed, a good-quality moving image can be recorded without noise being superimposed on the moving image.

Furthermore, in the fourth example embodiment, a configuration in which bending vibration is excited at the infrared cut filter 410 is employed.

However, a configuration in which bending vibration is excited at an optical low-pass filter formed by bonding a birefringent plate, a phase plate, and an infrared cut filter together, a single birefringent plate, or single phase plate can also be employed.

According to example embodiments of the disclosure, even when the dust removal function and the LV display function are simultaneously performed, an image pickup apparatus capable of providing a real-time and good-quality LV display video image to the user can be provided.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-207315 filed Oct. 21, 2016, which is hereby incorporated by reference herein in its entirety.

What is claimed is:

1. An image pickup apparatus comprising:
   an image sensor configured to photoelectrically convert an optical image of a subject to accumulate electric charge;
   an optical member located on a subject side of the image sensor;
   a vibration unit configured to vibrate the optical member;
   a display unit configured to display a moving image based on a captured image signal output from the image sensor; and
   a control unit configured to perform drive control of the image sensor, the vibration unit, and the display unit,
   wherein, in a case where the optical member is vibrated while the moving image is displayed, the control unit causes the vibration unit to vibrate the optical member in a time between two readout periods for reading out electric charge accumulated in the image sensor and not to vibrate the optical member in the readout periods.

2. The image pickup apparatus according to claim 1, wherein, in a case where vibration of the optical member and displaying of the moving image are simultaneously performed, the control unit performs updating of frames of the moving image displayed by the display unit during the vibration of the optical member.

3. The image pickup apparatus according to claim 1, wherein, in a case where the optical member is vibrated while the moving image is displayed, the control unit makes a frame rate of displaying of the moving image lower than in a case where the optical member is not vibrated while the moving image is displayed.

4. The image pickup apparatus according to claim 1, wherein, in a case where the optical member is vibrated while the moving image is displayed, the control unit makes a period of accumulating the electric charge longer than in a case where the optical member is not vibrated while the moving image is displayed.

5. The image pickup apparatus according to claim 1, wherein, in a case where the optical member is vibrated while the moving image is displayed, the control unit makes a number of readout lines read out in the readout period smaller than in a case where the optical member is not vibrated while the moving image is displayed.

6. An image pickup apparatus comprising:
   an image sensor configured to photoelectrically convert an optical image of a subject to accumulate electric charge;
   an optical member located on a subject side of the image sensor;
   a vibration unit configured to vibrate the optical member;
   a display unit configured to display a moving image based on a captured image signal output from the image sensor; and
   a control unit configured to perform drive control of the image sensor, the vibration unit, and the display unit,
   wherein, in a case where the optical member is vibrated while the moving image is displayed, the control unit performs at least one of drive control to set a drive frequency of the vibration unit to an integral multiple of a readout cycle of the readout period for reading out electric charge accumulated in the image sensor and drive control to set a drive voltage of the vibration unit smaller than a predetermined value.

7. The image pickup apparatus according to claim 6, wherein, in a case where the optical member is vibrated while the moving image is displayed, the control unit makes a frame rate of displaying of the moving image lower than in a case where the optical member is not vibrated while the moving image is displayed.

8. The image pickup apparatus according to claim 6, wherein, in a case where the optical member is vibrated while the moving image is displayed, the control unit makes a period of accumulating the electric charge longer than in a case where the optical member is not vibrated while the moving image is displayed.

9. The image pickup apparatus according to claim 6, wherein, in a case where the optical member is vibrated while the moving image is displayed, the control unit makes a number of readout lines read out in the readout period smaller than in a case where the optical member is not vibrated while the moving image is displayed.

10. An image pickup apparatus comprising:
an image sensor configured to photoelectrically convert an optical image of a subject to accumulate electric charge;
an optical member located on a subject side the image sensor;
a vibration unit configured to vibrate the optical member;
a recording unit configured to record a moving image based on a captured image signal output from the image sensor; and
a control unit configured to perform drive control of the image sensor, the vibration unit, and the recording unit,
wherein, in a case where the optical member is vibrated while the moving image is recorded, the control unit causes the vibration unit to vibrate the optical member in a time between two readout periods for reading out electric charge accumulated in the image sensor and not to vibrate the optical member in the readout periods.

11. An imaging method comprising:
performing an imaging process of causing an image sensor to photoelectrically convert an optical image of a subject to accumulate electric charge;
performing a vibration process of vibrating an optical member located on a subject side of the image sensor;
performing a display process of displaying a moving image based on a captured image signal output from the image sensor; and
performing a control process of performing drive control of the imaging process, the vibration process, and the display process,
wherein, in a case where the optical member is vibrated while the moving image is displayed, the control process causes the vibration process to vibrate the optical member in a time between two readout periods for reading out electric charge accumulated in the image sensor and not to vibrate the optical member in the readout periods.

12. An imaging method comprising:
performing an imaging process of causing an image sensor to photoelectrically convert an optical image of a subject to accumulate electric charge;
performing a vibration process of vibrating an optical member located on a subject side of the image sensor;
performing a display process of displaying a moving image based on a captured image signal output from the image sensor; and
performing a control process of performing drive control of the imaging process, the vibration process, and the display process,
wherein, in a case where the optical member is vibrated while the moving image is displayed, the control process performs at least one of drive control to set a drive frequency of the vibration process to an integral multiple of a readout cycle of the readout period for reading out electric charge accumulated in the image sensor and drive control to set a drive voltage of the vibration process smaller than a predetermined value.

13. An imaging method comprising:
performing an imaging process of causing an image sensor to photoelectrically convert an optical image of a subject to accumulate electric charge;
performing a vibration process of vibrating an optical member located on a subject side of the image sensor;
performing a recording process of recording a moving image based on a captured image signal output from the image sensor; and
performing a control process of performing drive control of the imaging process, the vibration process, and the recording process,
wherein, in a case where the optical member is vibrated while the moving image is recorded, the control process causes the vibration process to vibrate the optical member in a time between two readout periods for reading out electric charge accumulated in the image sensor and not to vibrate the optical member in the readout periods.

* * * * *